US012690508B2

(12) United States Patent
Eller et al.

(10) Patent No.: US 12,690,508 B2
(45) Date of Patent: Jul. 28, 2026

(54) ATTACHMENT ASSEMBLY FOR POWERED IMPLEMENTS

(71) Applicant: Great Plains Manufacturing, Inc., Salina, KS (US)

(72) Inventors: Jared Eller, Flower Mound, TX (US); Lance Taylor, Justin, TX (US)

(73) Assignee: Great Plains Manufacturing, Inc., Salina, KS (US)

( * ) Notice: Subject to any disclaimer, the term of this patent is extended or adjusted under 35 U.S.C. 154(b) by 1250 days.

(21) Appl. No.: 17/477,606

(22) Filed: Sep. 17, 2021

(65) Prior Publication Data

US 2022/0087090 A1 Mar. 24, 2022

Related U.S. Application Data

(60) Provisional application No. 63/080,097, filed on Sep. 18, 2020.

(51) Int. Cl.
*A01B 59/06* (2006.01)
*A01B 71/06* (2006.01)

(52) U.S. Cl.
CPC ............ *A01B 59/062* (2013.01); *A01B 71/06* (2013.01)

(58) Field of Classification Search
CPC ........ A01B 59/062; A01B 59/06; A01B 71/06
See application file for complete search history.

(56) References Cited

U.S. PATENT DOCUMENTS

| | | | | |
|---|---|---|---|---|
| 3,985,249 A | * | 10/1976 | Aker et al. ............ | E02F 3/3631 |
| | | | | 172/275 |
| 4,243,356 A | * | 1/1981 | Takojima .............. | E02F 3/3672 |
| | | | | 414/723 |
| 4,436,477 A | * | 3/1984 | Lenertz et al. ....... | E02F 3/3622 |
| | | | | 37/468 |
| 4,887,680 A | | 12/1989 | Nozaka et al. | |
| 4,934,471 A | | 6/1990 | Tanaka et al. | |
| 5,071,311 A | * | 12/1991 | Foster et al. ......... | A01D 87/127 |
| | | | | 414/24.5 |

(Continued)

FOREIGN PATENT DOCUMENTS

| | | | | |
|---|---|---|---|---|
| JP | H10286005 A | | 4/2004 | |
| WO | WO-2014125466 A1 | * | 8/2014 | ........... A01B 59/066 |

OTHER PUBLICATIONS

Various Authors, "Removing loader," Dated Aug. 1, 2011, Retrieved Sep. 29, 2025, Yesterday's Tractor Co., <https://forums.yesterdaystractors.com/threads/removing-loader.848870/> (Year: 2011).*

*Primary Examiner* — Christopher J Sebesta
*Assistant Examiner* — Joel F. Mitchell
(74) *Attorney, Agent, or Firm* — Hovey Williams LLP; Kameron D. Kelly

(57) ABSTRACT

An attachment assembly for connecting an agricultural implement to a tractor. The attachment assembly comprises tractor-side frame configured to extend from the tractor. The attachment assembly additionally comprises an implement-side frame configured to be removably attached to the implement. The implement-side frame is configured to rotate with respect to the tractor-side frame. The implement-side frame comprises connection elements configured to attach the implement to the implement-side frame. The connection elements provide at least four points of connection for the implement.

12 Claims, 23 Drawing Sheets

(56)  References Cited

U.S. PATENT DOCUMENTS

| | | | |
|---|---|---|---|
| 5,466,113 A * | 11/1995 | Norberg | A01B 59/064 37/468 |
| 5,657,825 A * | 8/1997 | Englund | A01B 59/062 280/416.2 |
| 5,779,429 A | 7/1998 | Poole | |
| 5,816,339 A | 10/1998 | Parsons et al. | |
| 5,975,216 A * | 11/1999 | Gibbons | A01B 59/068 172/677 |
| 5,997,024 A | 12/1999 | Cowley | |
| 6,595,299 B2 | 7/2003 | Heller | |
| 6,827,154 B2 | 12/2004 | Heller | |
| 6,986,634 B2 * | 1/2006 | Westendorf et al. | E02F 3/6273 172/273 |
| 7,278,502 B2 | 10/2007 | Trefz et al. | |
| 7,404,448 B2 | 7/2008 | Tuttle et al. | |
| 7,575,077 B2 | 8/2009 | Priepke et al. | |
| 7,690,439 B2 | 4/2010 | Priepke et al. | |
| 7,861,794 B2 | 1/2011 | Tarasinski et al. | |
| 8,312,947 B2 | 11/2012 | Goulet et al. | |
| 8,696,024 B2 | 4/2014 | Theriault et al. | |
| 9,033,074 B1 | 5/2015 | Gates | |
| 9,485,899 B2 * | 11/2016 | Ribo et al. | A01B 59/002 |
| 9,775,276 B2 | 10/2017 | Hyder | |
| 10,005,503 B2 | 6/2018 | Fehr | |
| 10,015,922 B2 | 7/2018 | Ribo | |
| 10,156,260 B1 | 12/2018 | Livengood | |
| 10,455,753 B2 | 10/2019 | Mollick | |
| 10,462,954 B2 | 11/2019 | Quoniam et al. | |
| 11,343,954 B2 * | 5/2022 | Thorsell | A01B 71/06 |
| 2007/0169951 A1 | 7/2007 | Clement et al. | |

* cited by examiner

ATTACHMENT ASSEMBLY FOR POWERED IMPLEMENTS

CROSS-REFERENCE TO RELATED APPLICATION

The present non-provisional patent application claims priority benefits to U.S. Provisional Patent Application Ser. No. 63/080,097, filed Sep. 18, 2020, and entitled "SWIFT CONNECT HITCH." The above-identified provisional patent application is hereby incorporated by reference in its entirety into the present non-provisional patent application.

FIELD OF THE INVENTION

Embodiments of the present invention are generally directed to an attachment assembly for operably connecting an agricultural implement to a prime mover. More particularly, embodiments of the present invention are directed to an attachment assembly configured to quickly and efficiently connect, in an operable manner, an agricultural implement to a prime mover and/or to a power take-off of the prime mover.

BACKGROUND OF THE INVENTION

Certain agricultural implements, such as tillers, rotary cutters, seeders, snow blowers/removers, power rakes, brooms, saws, and the like, are powered by a power take-off from a prime mover (hereinafter referred to as a "tractor"). Attaching such agricultural implements to the tractor can be a difficult and time-consuming process. For example, agricultural implements will often be configured for attachment to a three-point hitch extending from the rear of the tractor. Such a three-point hitch will include a pair of spaced apart lower arms (i.e., lifting arms) and an upper, central arm (i.e., a top link). Generally, the lifting arms and the top link will be arranged in a triangular configuration, with the lifting arms being actuatable (e.g., raising and lowering) by the tractor's hydraulic system. As such, when the agricultural implement is attached to the three-point hitch, the agricultural implement can be raised and lowered by the tractor.

To attach the agricultural implement to the three-point hitch, the implement will generally include a set of hitch pins configured to engage with the lifting arms and with the top link of the three-point hitch. The hitch pins may be secured directly to the agricultural implement and/or may be coupled to the agricultural implement via one or more brackets. Regardless, the agricultural implement will generally include two lower hitch pins, which are each configured to engage with hitch points at free ends of the lifting arms. The agricultural implement will generally also include an upper hitch pin configured to engage with a hitch point on a free end of the top link.

Although a three-point hitch, as described above, can be used to connect an agricultural implement to a tractor, facilitating such a connection is often labor-intensive and time-consuming. An operator of the tractor will need to maneuver the tractor to a proper position for connection. The operator will then be required to dismount the tractor to connect the implement to the three-point hitch. Such a process will then need to be repeated each time the operator needs to attach a new implement to the tractor. Furthermore, the use of a three-point hitch generally does not help facilitate the connection of the tractor's power take-off to the implement, if necessary.

In addition to the above, in some instances, agricultural implements may unwantedly tilt, rotate, or otherwise become imbalanced when connecting with a three-point hitch. For example, an implement in the form of a rotary cutter, such as shown in FIG. 1A, may include only a single supporting wheel extending from a rear of the rotary cutter. When connecting such a rotary cutter to a three-point hitch, the rotary cutter may unwantedly tilt or rotate about the supporting wheel (e.g., about a longitudinal axis extending in a forward/rearward direction), making it difficult to secure the rotary cutter to the hitch and/or to the prime mover.

SUMMARY OF THE INVENTION

In one embodiment of the present invention, there is provided an attachment assembly for connecting an agricultural implement to a tractor. The attachment assembly comprises tractor-side frame configured to extend from the tractor. The attachment assembly additionally comprises an implement-side frame configured to be removably attached to the implement. The implement-side frame is configured to rotate with respect to the tractor-side frame. The implement-side frame comprises connection elements configured to attach the implement to the implement-side frame. The connection elements provide at least four points of connection for the implement.

In another embodiment of the present invention, there is provided a method of attaching an implement to a tractor. The method comprises a step of providing an attachment assembly extending from the tractor. The attachment assembly comprises a tractor-side frame and an implement-side frame rotatably coupled with the tractor-side frame. The attachment assembly is configured to be shifted between a closed configuration and an open configuration. The implement side frame comprises connection elements configured to attach the implement to the implement-side frame. The connection elements provide at least four points of connection for the implement. An additional step includes shifting the attachment assembly to the open configuration. An additional step includes securing the implement-side frame to the implement. A further step includes shifting the attachment assembly to the closed configuration.

In still another embodiment of the present invention, there is provided an attachment assembly for connecting an agricultural implement to a tractor. The attachment assembly comprise a tractor-side frame configured to extend from the tractor. The attachment assembly additionally comprises an implement-side frame configured to be removably attached to the implement. The implement-side frame comprises a pair of vertical support elements. The implement-side frame is configured to rotate with respect to the tractor-side frame. The attachment assembly further comprises a power take-off (PTO) adapter configured to connect a PTO drive element of the tractor with a PTO receiving element of the implement. The PTO adapter comprises an adapter plate that includes keys extending from lateral sides of the adapter plate. The keys are configured to be received within slots formed in the vertical support elements. The slots each includes a lower portion having an arcuate shape.

In yet another embodiment of the present invention, there is provided a method of attaching an implement to a tractor. The method comprises a step of providing an attachment assembly extending from the tractor. The attachment assembly comprises a tractor-side frame and an implement-side frame rotatably coupled with the tractor-side frame. The attachment assembly is configured to be shifted between a closed configuration and an open configuration. An additional step includes connecting a PTO drive element of the tractor with a PTO receiving element of the implement via a power take-off (PTO) adapter engaged with the implement-side frame. The PTO adapter comprises an adapter plate having keys engaged within slots formed in the implement-side frame. In the closed configuration an orientation of the PTO adapter is aligned with the tractor-side frame. A further step includes shifting the attachment assembly to the open configuration. During the shifting step, the implement-side frame is rotated away from the tractor-side frame and the keys of the PTO adapter translate through lower, arcuate shaped portions of the slots of the implement-side frame such that the orientation of the PTO adapter remains generally aligned with the tractor-side frame.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1A:
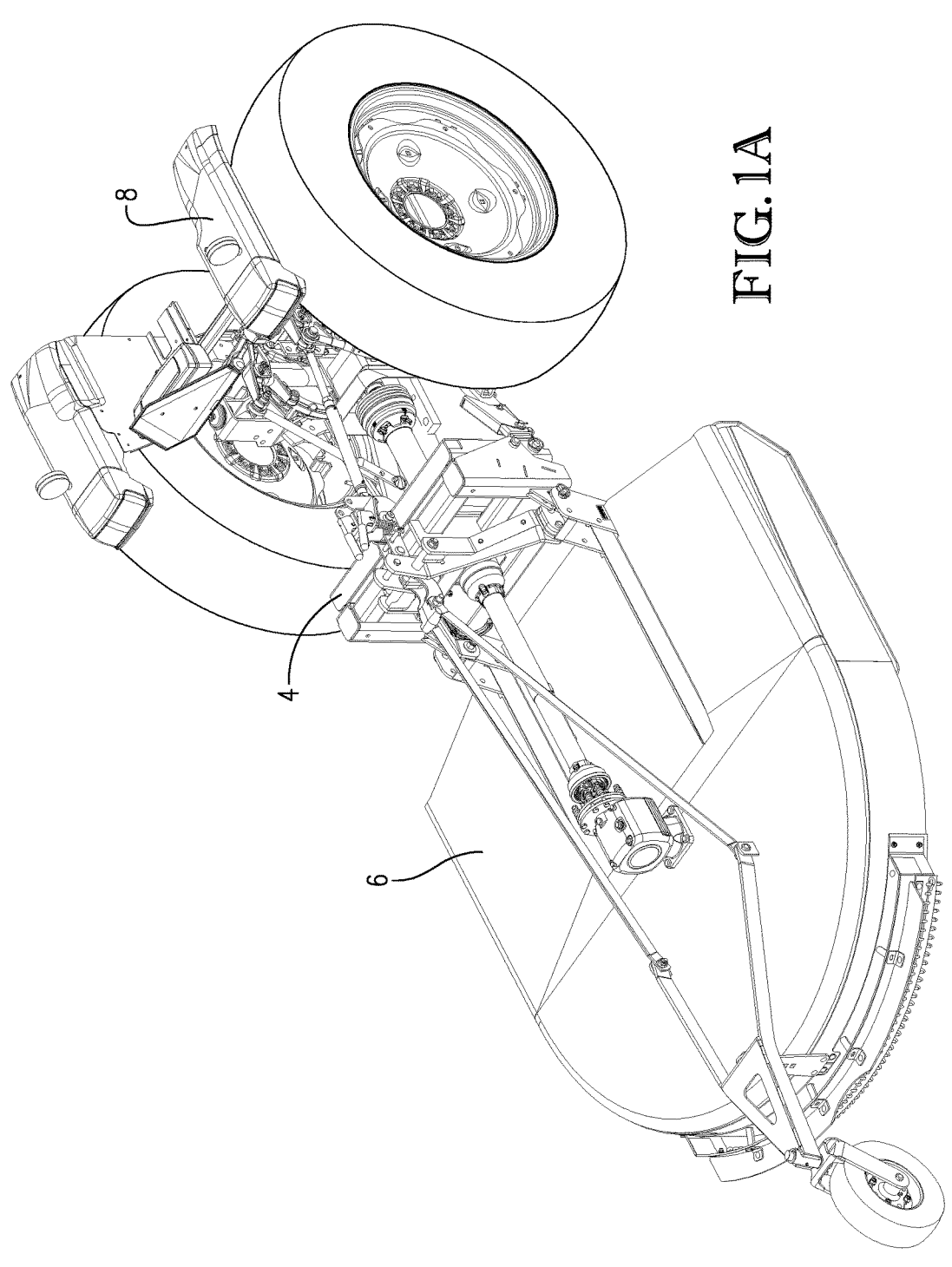
FIG. 1A is a right side perspective view of an implement, in the form of a rotary cutter, secured to a tractor via an attachment assembly according to embodiments of the present invention.
Figure 1B:
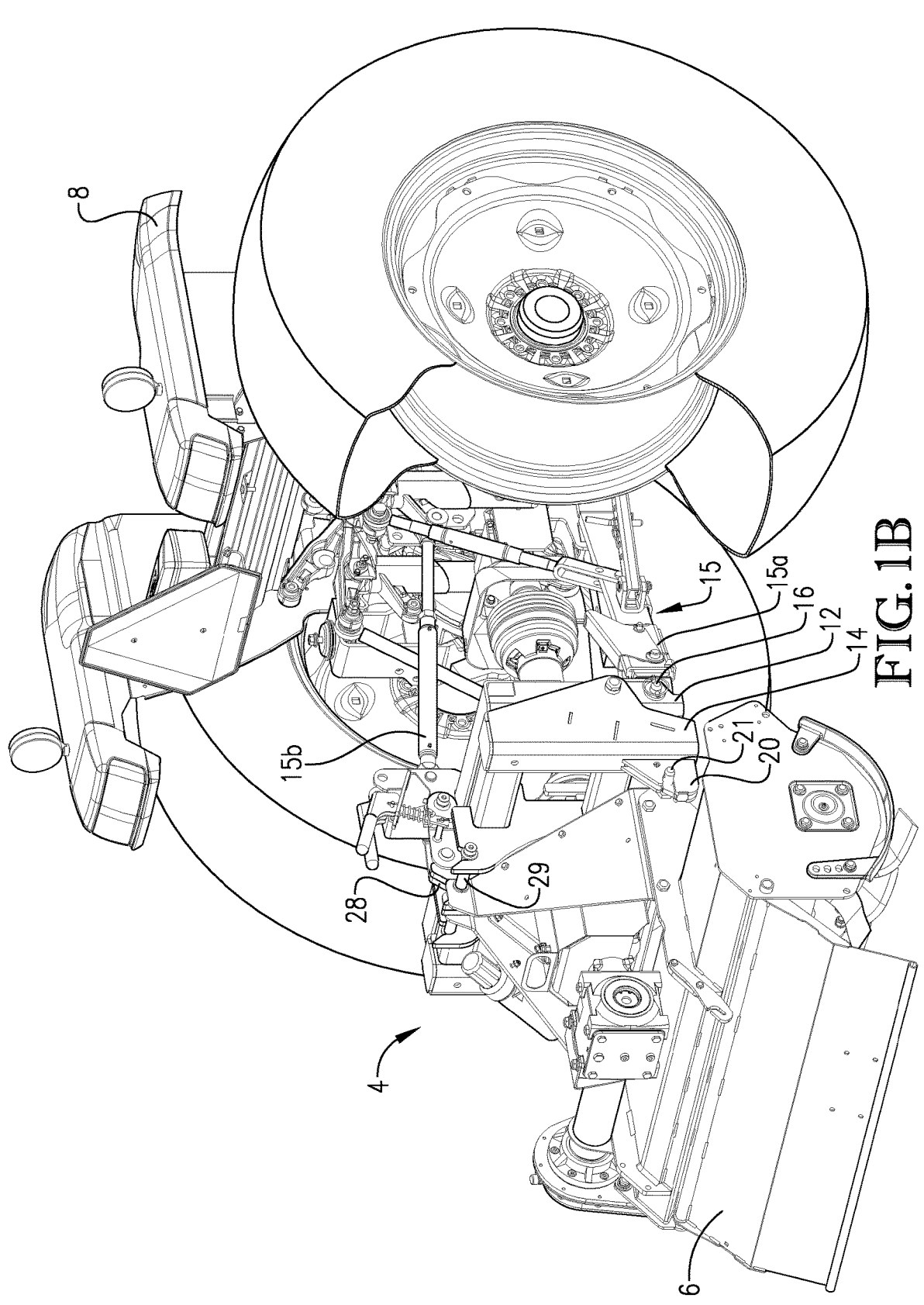
FIG. 1B is a right, rear perspective view of an implement, in the form of a tiller, secured to a tractor via an attachment assembly according to embodiments of the present invention.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Broadly, embodiments of the present invention are directed to an attachment assembly 4, as illustrated in FIGS. 1-4, which may be used to quickly and efficiently connect an agricultural implement 6 (referred to herein as an "implement") to a prime mover 8 (referred to herein as a "tractor"). In some embodiments, the attachment assembly 4 will be configured for use with powered implements 6 that require rotary power from the tractor 8 for operation. Such implements 6 include, for instance, tillers, rotary cutters, seeders, snow blowers/removers, power rakes, brooms, saws, or the like. Thus, in some embodiments, the attachment assembly 4 will facilitate connection of such implements 6 to the power take-off (referred to herein as "PTO") of the tractor 8. The embodiments shown in FIGS. 1B-4 show an exemplary implement 6 in the form of a tiller (whereas FIG. 1A shows an exemplary implement 6 in the form of a rotary cutter or mower).

Turning to the attachment assembly 4 in more detail, as shown in FIGS. 5-8, the attachment assembly 4 may comprise a tractor-side frame 12 and an implement-side frame 14. Broadly, as illustrated in FIGS. 1-4, the tractor-side frame 12 is configured to be releasably secured to the tractor 8, while the implement-side frame 14 is configured to be releasably secured to the implement 6. Nevertheless, it should be understood that in some embodiments, the attachment assembly 4 may be permanently integrated with the tractor 8. For example, the tractor-side frame 12 may be permanently secured with and/or form part of a rear end of the tractor 8. As shown in the drawings, each of the tractor-side frame 12 and the implement-side frame 14 may be formed generally in a U-shape. In particular, and with reference to FIGS. 5-8, the tractor-side frame 12 may include a horizontally-extending upper bar 12a and a pair of vertically-extending side bars 12b that extend downward from lateral ends of the upper bar 12a. Similarly, the implement-side frame 14 may include a horizontally-extending upper bar 14a and a pair of vertically-extending side bars 14b that extend downward from lateral ends of the upper bar 14a. In some embodiments, the upper bars 12a, 14a and side bars 12b, 14b may be formed from hollowed panels of steel or other material of sufficient strength. Alternatively, or in addition, in some embodiments, at least portions of the upper bars 12a, 14a and/or side bars 12b, 14b may be formed as c-channels. For example, with reference to FIGS. 5 and 6 and as will be discussed in more detail below, forward portions of the side bars 14b of the implement-side frame 14 may be open, so as to permit portions of the side bars 12b of the tractor-side frame 12 to be rotatably secured within the side bars 14b of the implement-side frame 14. Similarly, forward portions of the side bars 12b of the tractor-side frame 12 may be open, so as to permit the portions of the tractor 8 (e.g., the three-point hitch 15 or three-point linkage 15 shown in FIGS. 1-4) to be secured within the side bars 12b of the tractor-side frame 12.

As used herein, the terms "front" or "forward" refer to a direction toward the tractor 8 when viewed from behind the tractor 8 and the implement 6 (with reference to FIGS. 1-4), whereas the terms "back," "rear," or "rearward" refer to an opposite direction (i.e., toward the implement 6 when viewed from in front of the tractor 8 and the implement 6). As such, when the attachment assembly 4 is in use to secure an implement 6 to a rear side of a tractor 8 (e.g., FIGS. 1-4), the tractor-side frame 12 is positioned forward of the implement-side frame 14, and the implement-side frame 14 is positioned rearward from the tractor-side frame 12.

Figure 5:
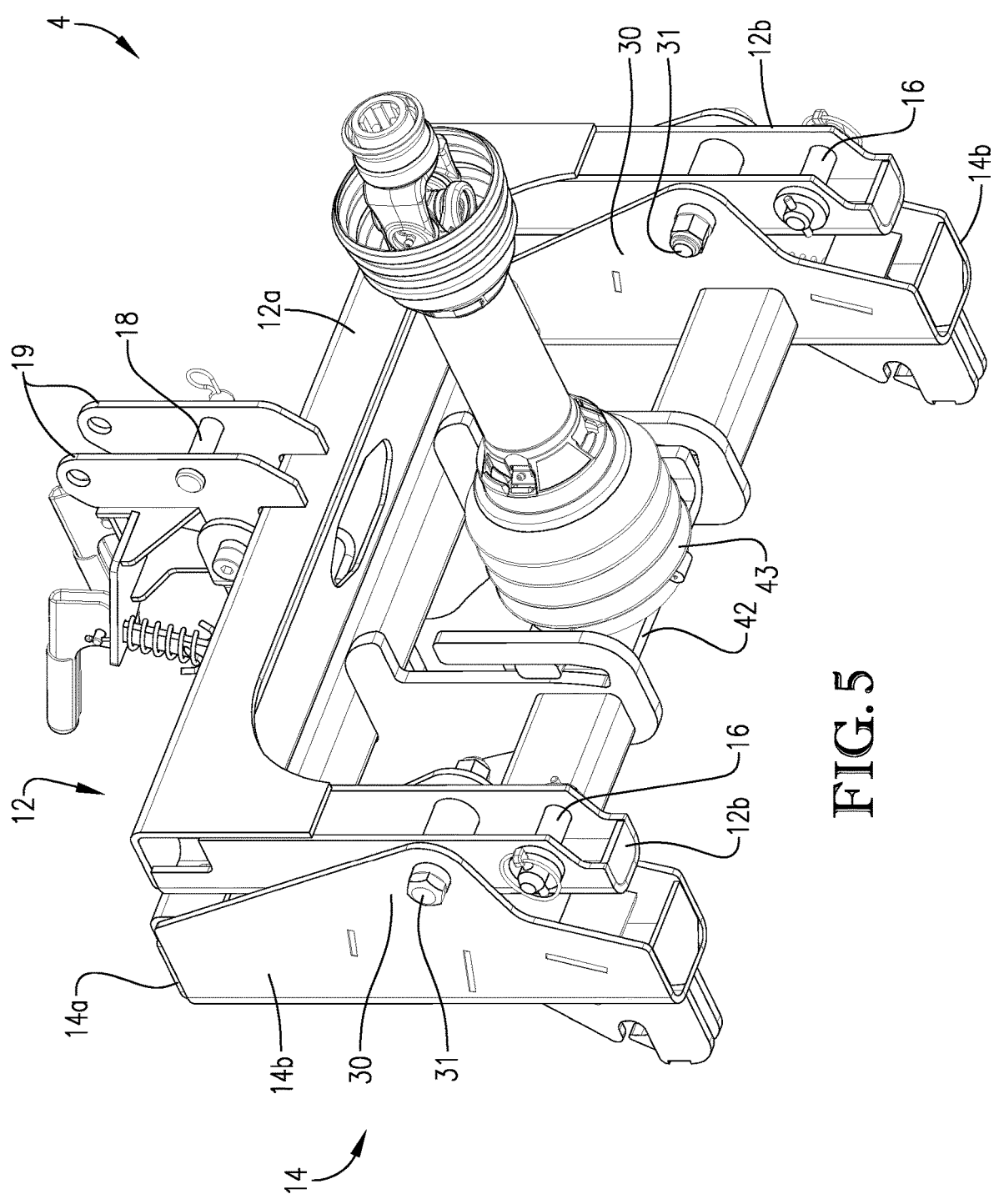
FIG. 5 is a front perspective view of the attachment assembly from FIGS. 1B-4, with the attachment assembly in a closed configuration and connected to a power-take off (PTO) connection assembly of the tractor from FIGS. 1B-4.
Figure 6:
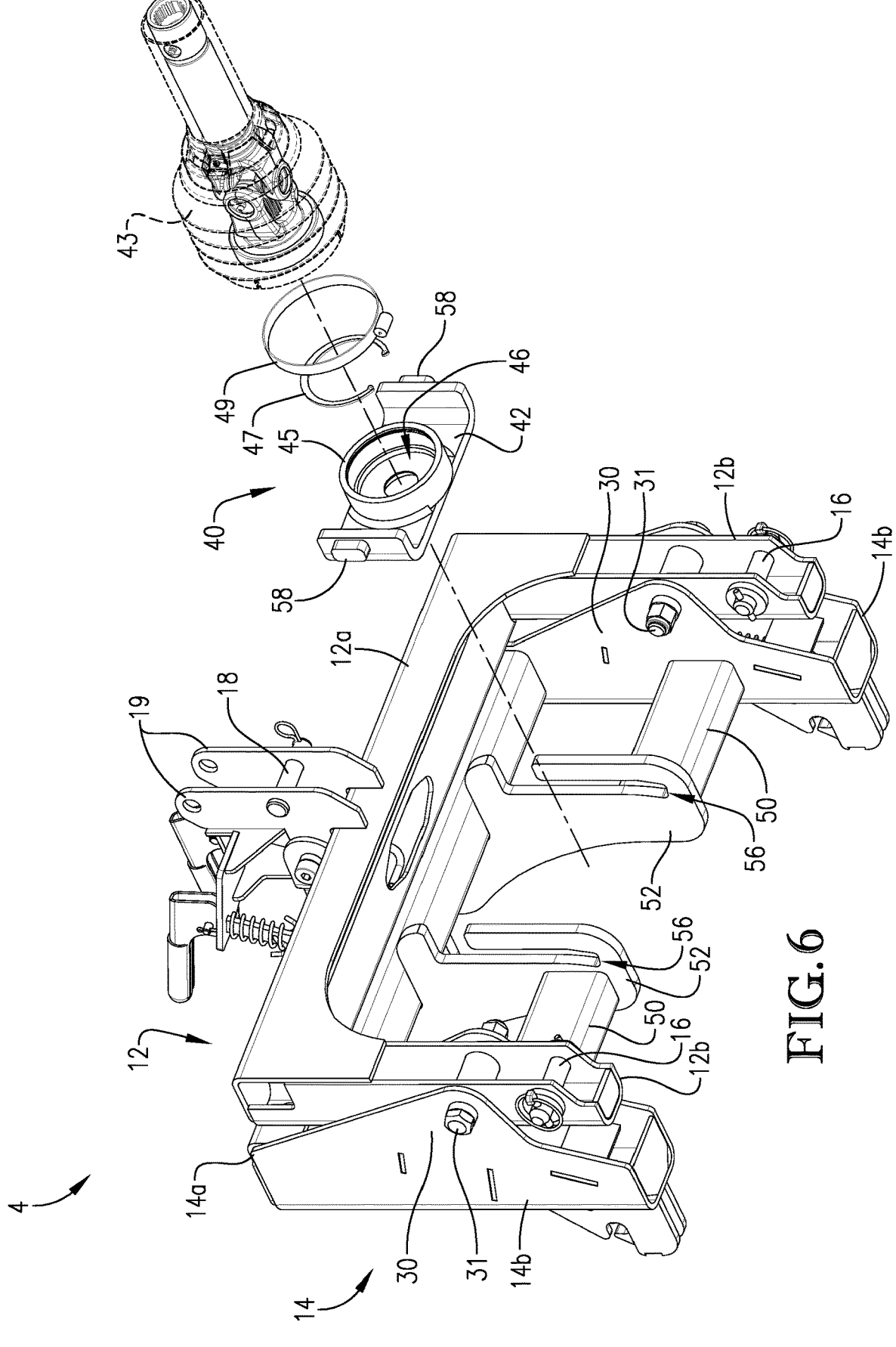
FIG. 6 is a front perspective view of the attachment assembly from FIG. 5, with the PTO connection assembly of the tractor and a PTO adapter of the attachment assembly shown separated from remaining components of the attachment assembly.

Turning to the tractor-side frame 12 in more detail, in some embodiments, each of the side bars 12b may have an open front panel adjacent a bottom end of the side bar 12b, as is shown in FIGS. 5-6. As such, the side bars 12b present an opening into the interior space of the side bar 12b, through which the tractor 8 can be secured to the attachment assembly 4. In more detail, the tractor-side frame 12 can be secured to the three-point hitch 15 of the tractor 8 by, as shown in FIGS. 1-4, inserting ends of lifting arms 15a of the three-point hitch 15 into the interior spaces of the side bars 12b. A lower hitch pin 16 can then be inserted through openings formed in side panels of each of the side bars 12b and through a hitch point of the lifting arm 15a positioned within such side bar 12b. Thus, the lifting arms 15a of the three-point hitch 15 can be secured to the bottoms of the side bars 12b, via the lower hitch pins 16, so as to secure the lower portions of the tractor-side frame 12 of the attachment assembly 4 to the three-point hitch 15 of the tractor 8.

In addition, the upper bar 12a of the tractor-side frame 12 may include an upper hitch pin 18, as shown in FIGS. 5 and 6, which is held in place between a pair of parallel securing plates 19 that extend upward and/or forward from the upper bar 12a. The upper hitch pin 18 and/or the securing plates 19 may be centrally positioned with respect to the upper bar 12a, such that the upper hitch pin 18 can be secured to an upper hitch point of a top link 15b of the three-point hitch 15, so as to secure a top portion of the tractor-side frame 12 to the three-point hitch 15 of the tractor 8. Specifically, the upper hitch point of the top link 15b of the three-point hitch 15 may be positioned between the securing plates 19, and the upper hitch pin 18 can be inserted through openings formed in the securing plates 19 and the upper hitch point of the top link 15b of the three-point hitch 15 so as to secure the upper portion of the tractor-side frame 12 of the attachment assembly 4 to the three-point hitch 15 of the tractor 8.

As such, the tractor-side frame 12 may be configured to be removably attached to the three-point hitch 15 positioned at the rear of the tractor, such that the implement 6 can be attached to a rear of the tractor 8 (via the attachment assembly 4). In alterative embodiments, the tractor-side frame 12 may be configured to be removably attached to a three-point hitch 15 positioned at the front of the tractor, such that the implement 6 can be attached to a front of the tractor 8 (via the attachment assembly 4). It is noted, however, that in certain embodiments, the attachment assembly 4 may be permanently secured to the tractor 8 and/or may be integrated with or form part of the tractor 8. For example, the tractor-side frame 12 may be permanently secured to and/or may form part of the tractor 8, such that the attachment assembly 4 extends rearward/forward from the rear end/front end of the tractor 8.

Figure 7:
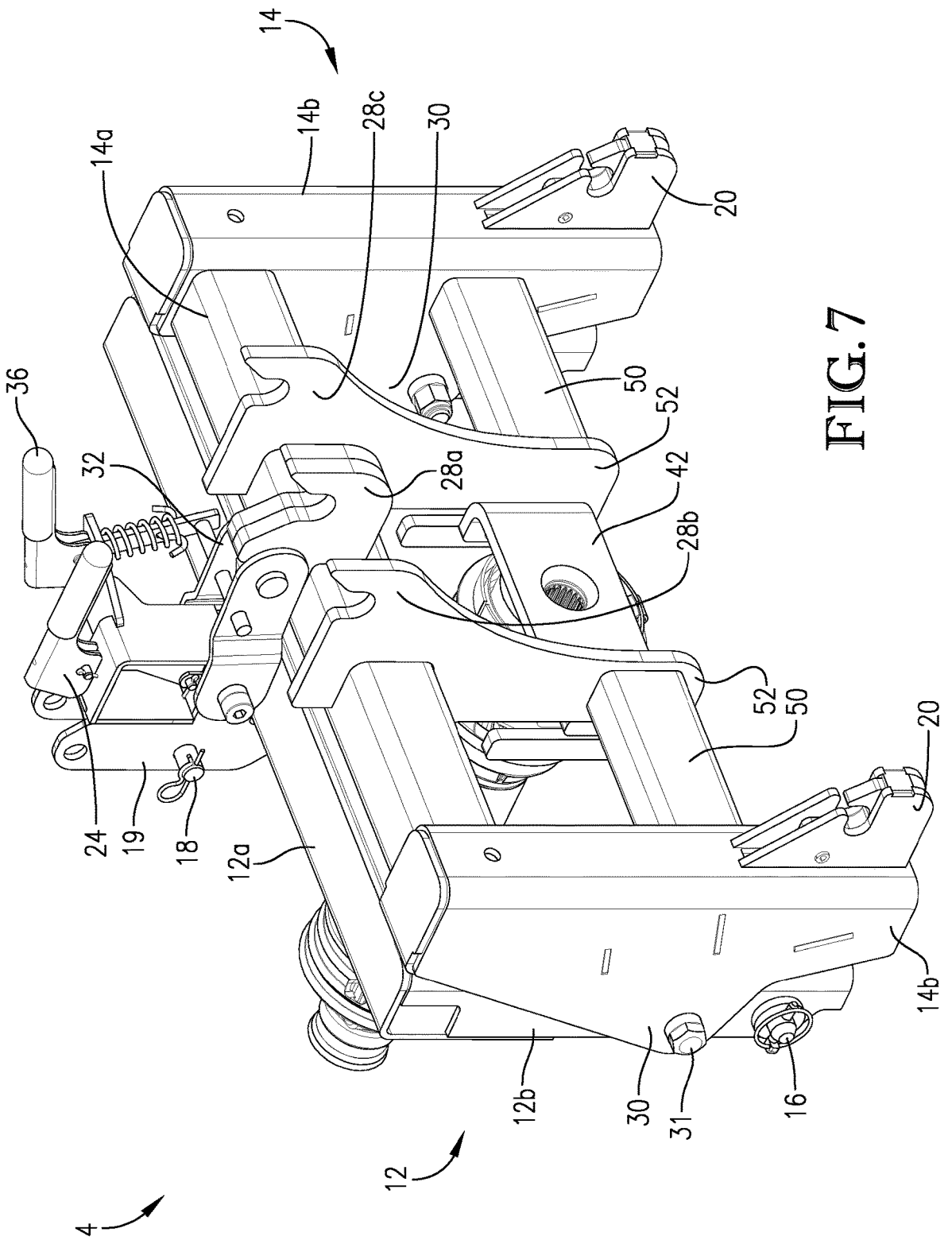
FIG. 7 is a rear perspective view of the attachment assembly from FIGS. 5 and 6, and the attachment assembly illustrated in a closed configuration.
Figure 8:
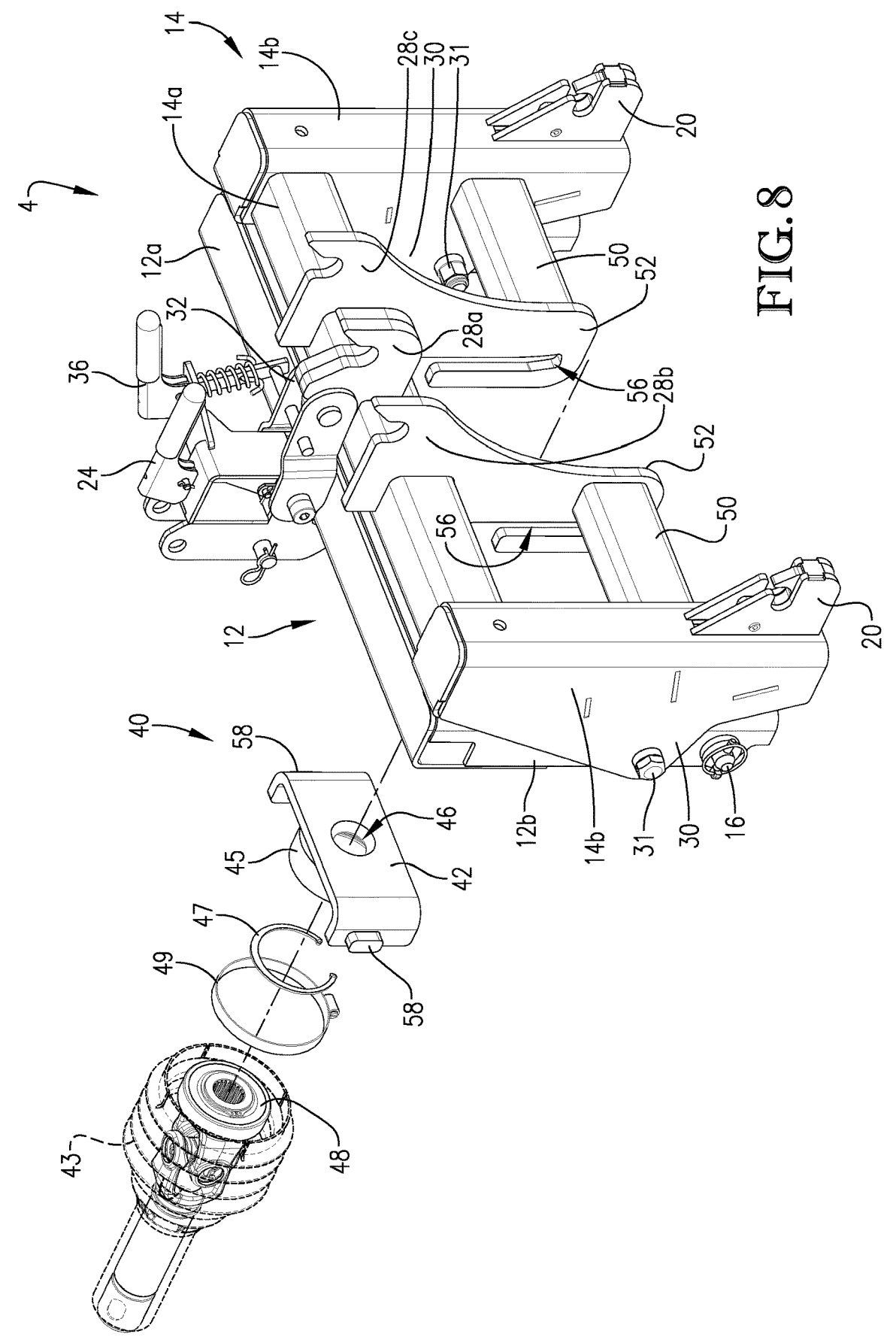
FIG. 8 is a rear perspective view of the attachment assembly from FIG. 7, with the PTO connection assembly of the tractor and the PTO adapter of the attachment assembly shown separated from remaining components of the attachment assembly.
Figure 9A:
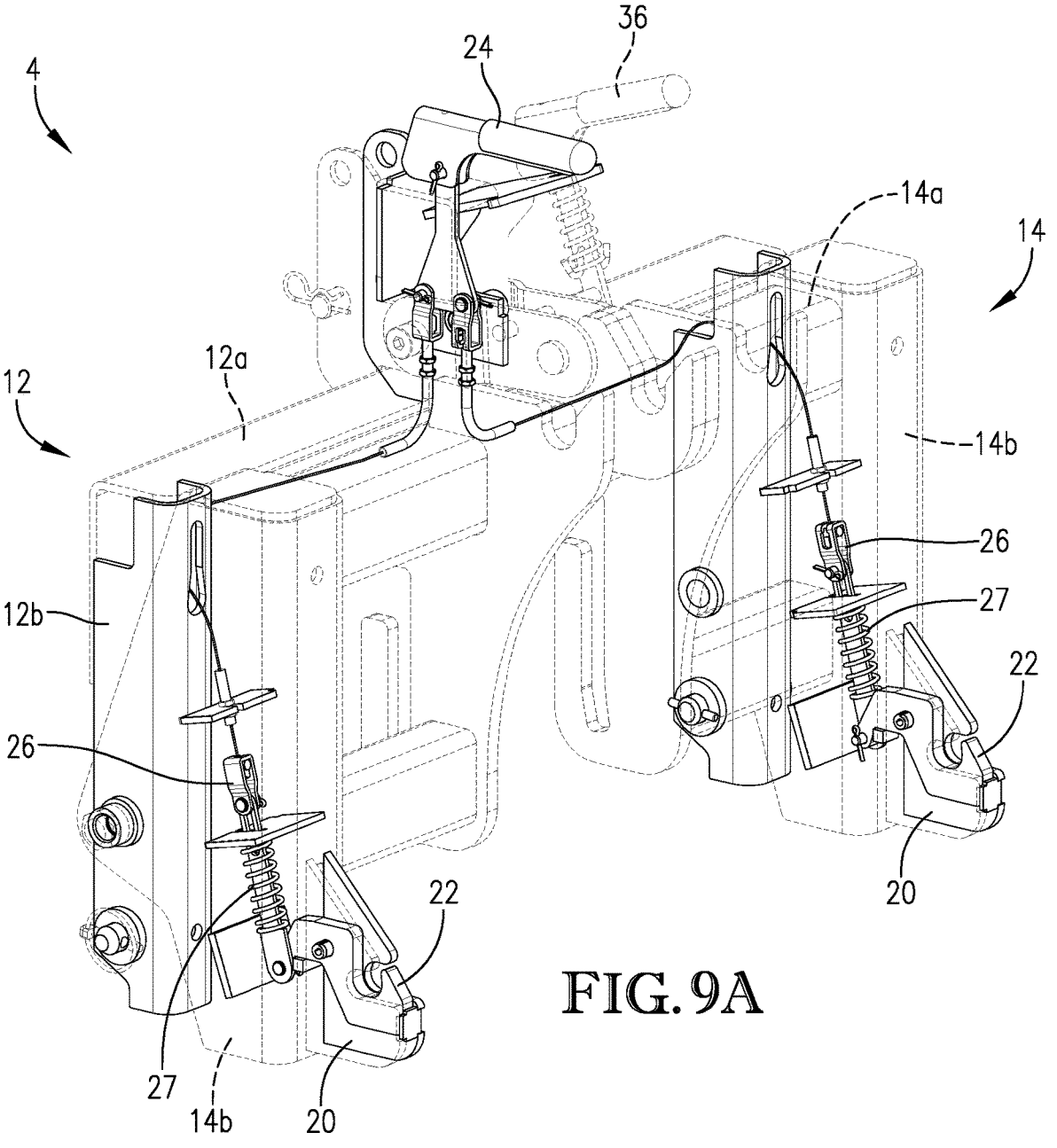
FIG. 9A is a rear perspective view of the attachment assembly from FIGS. 5-8, with a portion of the attachment assembly cut away to show an implement release assembly in a locked configuration.
Figure 9B:
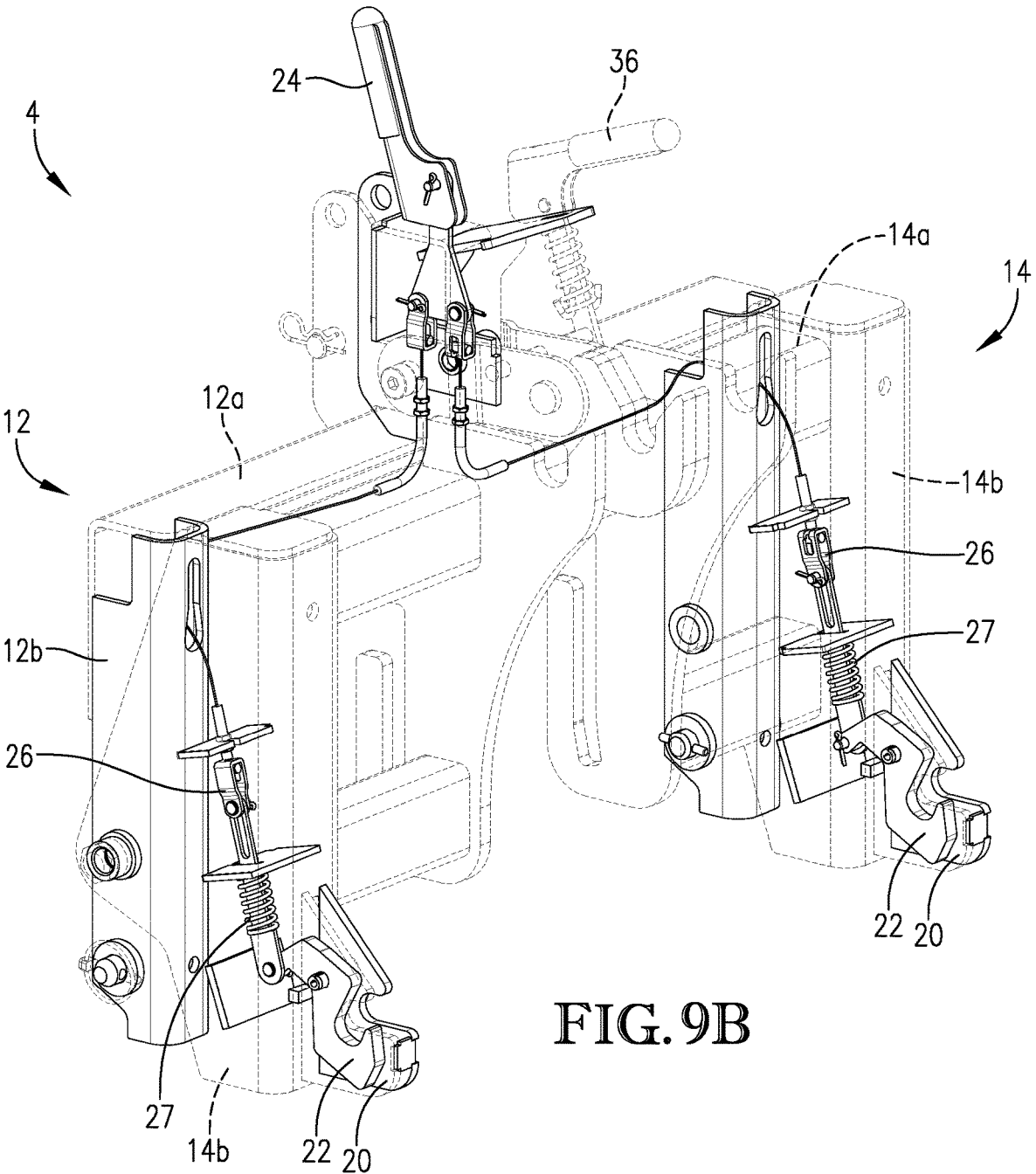
FIG. 9B is a rear perspective view of the attachment assembly from FIG. 9A, with the implement release assembly in an unlocked configuration.

Turning to the implement-side frame 14, as perhaps best shown in FIGS. 7 and 8, each of the side bars 14b may include a connection element(s) in the form of a lower engagement hook 20 extending rearward from a lower portion of the side bar 14*b*. The lower engagement hooks 20 each include a receiving groove that is configured to receive a lower hitch pin 21 of the implement 6, as shown in FIGS. 1-4. The implement-side frame 14 may provide for the lower engagement hooks 20 to be associated with an implement release assembly for selectively securing the lower hitch pins 21 of the implement 6 within the lower engagement hooks 20. In more detail and with reference to FIGS. 9A and 9B, the implement release assembly may include, for each lower engagement hook 20, an implement latch element 22 selectively configurable in a locked position (See, e.g., FIG. 9A) and an unlocked position (See, e.g., FIG. 9B). In the locked position, the implement latch element 22 is positioned so as to interfere with or block the receiving groove of the lower engagement hook 20, thereby blocking the receiving groove so as to prevent the lower hitch pin 21 of the implement 6 from being extracted from the lower engagement hook 20. In the unlocked position, the implement latch element 22 is moved downward so as to unblock the receiving groove of the lower engagement hook 20, thereby permitting the lower hitch pin 21 of the implement 6 to be freely extracted from the lower engagement hook 20.

The implement latch elements 22 may each be transitioned between locked and unlocked positions (and vice-versa) via a single implement release lever 24 pivotally coupled to a top panel of the upper bar 12*a* of the tractor-side frame 12 and/or of the upper bar 14*a* of the implement-side frame 14. In some embodiments, the implement release lever 24 may be supported on top of a bracket that extends up from the upper bar 12*a*. Regardless, the implement release lever 24 may be operably coupled to the implement latch elements 22 via linkage assemblies 26 that extending from the implement release lever 24, downward through interior spaces presented by the tractor-side and/or implement-side frames 12, 14, and to the implement latch element 22. As such, the implement release lever 24 can be actuated by the hand of an operator of the tractor 8 to a raised, unlocked position (See, e.g., FIG. 9B) to unlock the implement latch elements 22, and can be actuated to a lowered, locked position (See, e.g., FIG. 9A) to lock the implement latch elements 22. In some embodiments, the linkage assembly 26 may include cables or chains that engage with the implement latch elements 22, such that actuation of the cables can lock and unlock the implement latch elements 22. In some embodiments (not shown), the cables may be actuated via an actuation assembly (e.g., a winch) that permits the operator of the tractor to control actuation of the cables while sitting in the operating seat of the tractor 8. Alternatively, the cables may extend between the implement release levers 24 and the implement latch elements 22, such that actuation of the implement release levers 24 can lock and unlock the implement latch elements 22. As may be required, the cable assembly may additionally include one or more pulleys, rollers, and/or other components necessary for implementation and operation.

It should be noted that even in the locked positions, the implement latch elements 22 may still permit the lower hitch pins 21 of the implement 6 to be inserted into the lower engagement hooks 20. In more detail, as perhaps best shown in FIG. 9A, the rear-facing sides of the implement latch elements 22 may be formed with an upwardly-angled surface. As such, when a lower hitch pin 21 of the implement 6 comes into contact with the rear-facing side of the implement latch element 22 in the locked position (e.g., when a lower hitch pin 21 is being inserted within the lower engagement hook 20 while the implement latch element 22 is blocking the receiving groove), the lower hitch pin 21 can nevertheless force the implement latch element 22 downward so as to unblock the receiving groove to permit the lower hitch pin 21 to be received within the lower engagement hook 20. Upon the lower hitch pin 21 being inserted into the lower engagement hook 20, the implement latch element 22 may be automatically actuated upward, back to the original locked position, so as to inhibit the lower hitch pin 21 from being removed from the lower engagement hook 20. Such actuation of the implement latch element 22 upward to the locked position may be facilitated by a biasing element 27, such as a spring, which may form part of the linkage assembly 26. In some embodiments, each of the linkage assemblies 26 may include a biasing element 27, so as to bias each of the implement latch elements 22 in the locked position.

Returning to FIGS. 7 and 8, the implement-side frame 14 may additionally include connection elements in the form of a plurality of upper engagement hooks, which generally extend upward and/or rearward from the upper bar 14*a* of the implement-side frame 14. In some embodiments, as shown in the figures, the attachment assembly 4 may comprise three upper engagement hooks 28(*a*), 28(*b*), 28(*c*) that extend upward and/or rearward from the upper bar 14*a* of the implement-side frame 14. In such embodiments, the upper engagement hook 28(*a*) may be a central upper engagement hook, which is positioned near a center of the upper bar 14*a*. The remaining pair of upper engagement hooks 28(*b*) and 28(*c*) may be considered lateral upper engagement hooks, and may be spaced apart from each other, such as on either side of the single, centrally positioned upper engagement hook 28(*a*).

Figure 2:
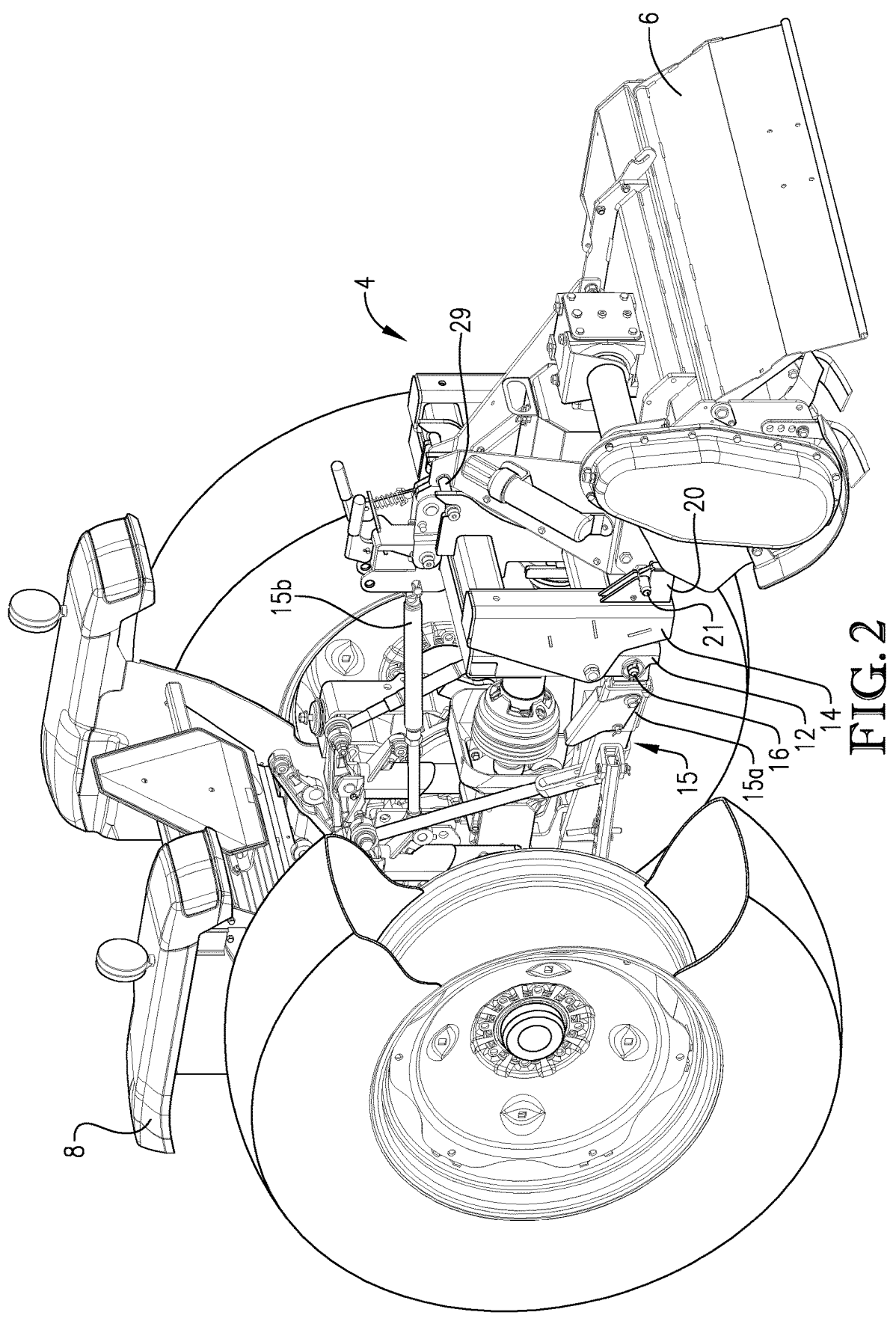
FIG. 2 is a left, rear perspective view of the implement secured to the tractor via the attachment assembly from FIG. 1.
Figure 3:
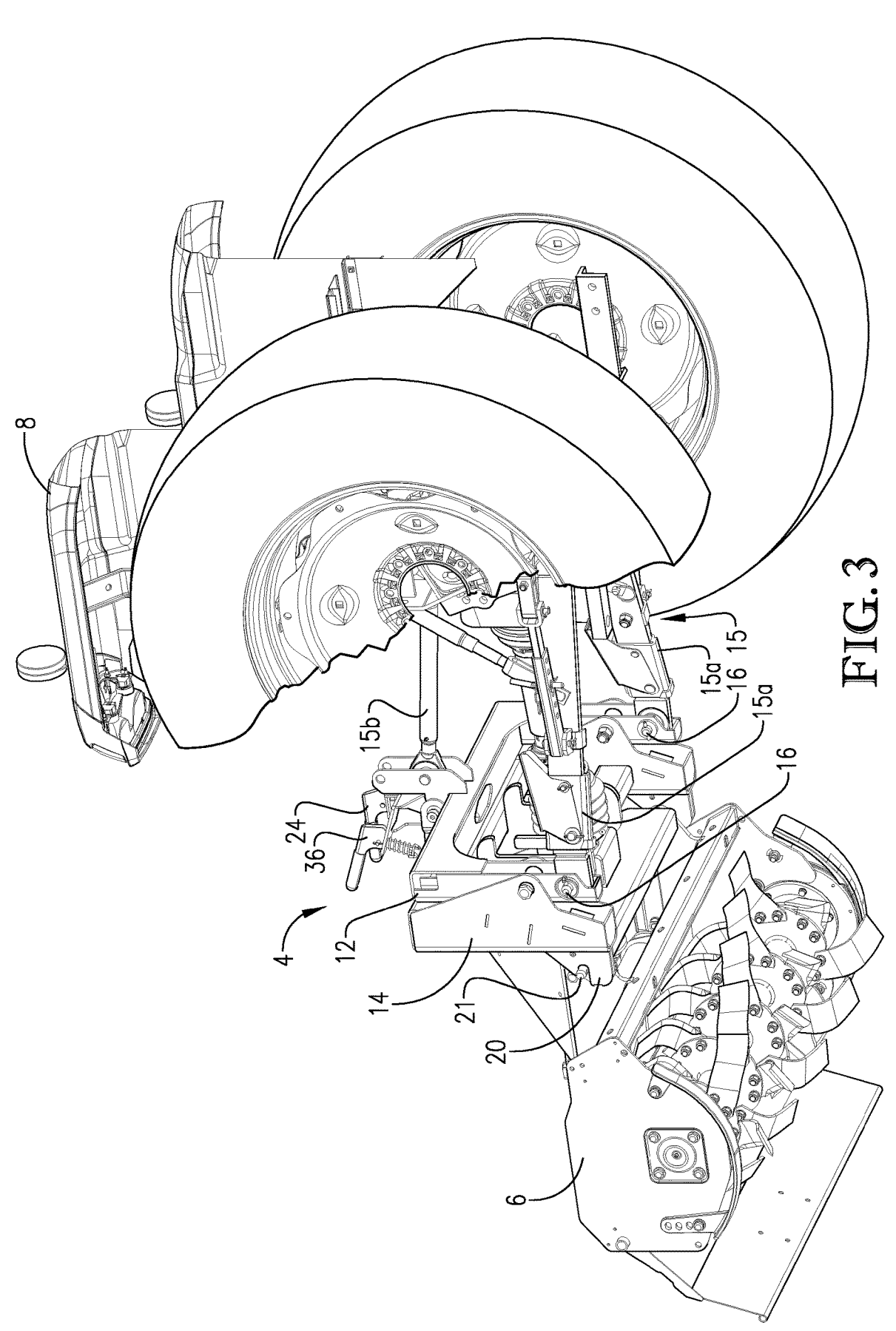
FIG. 3 is a right, lower perspective view of the implement secured to the tractor via the attachment assembly from FIGS. 1B and 2, with a portion of the tractor cut away to better illustrate the attachment assembly.
Figure 4:
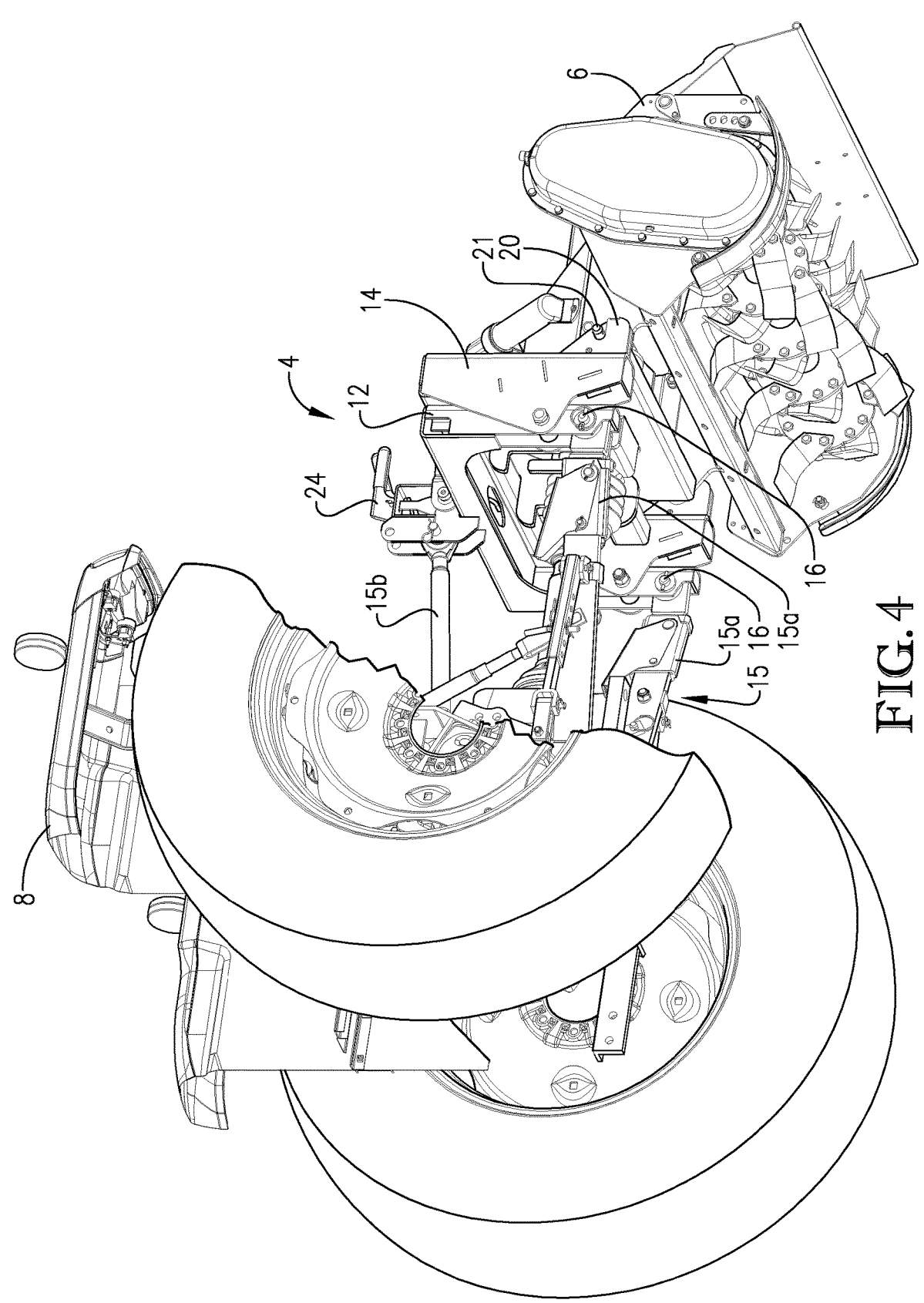
FIG. 4 is a left, lower perspective view of the implement secured to the tractor via the attachment assembly from FIGS. 1B-3, with a portion of the tractor cut away to better illustrate the attachment assembly.

In some embodiments, one or more of the upper engagement hooks 28(*a*), 28(*b*), 28(*c*) may be integrally formed with the upper bar 14*a* of the implement side frame 14. In other embodiments, one or more of the upper engagement hooks 28(*a*), 28(*b*), 28(*c*) may be integrally formed with the vertical support that are used to support the adapter plate (each of which is discussed in more detail below). Regardless, the upper engagement hooks 28(*a*), 28(*b*), 28(*c*) may each be aligned in a vertical with respect to a height of the attachment assembly 4, such that the upper engagement hooks are configured to receive a single pin, such as the upper hitch pin 29 of the implement 6, as illustrated in FIGS. 1 and 2. In certain embodiments, the upper hitch pin 29 of the implement 4 may have a length sufficient to be simultaneously received in each of the upper engagement hooks 28(*a*), 28(*b*), 28(*c*). In embodiments that only include two of the upper engagement hooks 28(*b*), 28(*c*), the upper hitch pin 29 may have sufficient length to be simultaneously received in both upper engagement hooks 28(*b*), 28(*c*).

In view of the above, the upper engagement hooks 28(*a*), 28(*b*), 28(*c*) may provide three points of contact for the upper hitch pin 29 of the implement 6 (in embodiments that include three upper engagement hooks 28(*a*), 28(*b*), 28(*c*)). However, in some embodiments, such as that may only include two upper engagement hooks (e.g., only the two lateral upper engagement hooks 28(*b*), 28(*c*)), the upper engagement hooks 28(*b*), 28(*c*) may provide two points of connection for the upper hitch pin 29. Regardless, the attachment assembly 4 of embodiments of present invention provides at least two and/or at least three points of connection to support the upper hitch pin 29, so as to provide enhanced stability to the implement 6, particularly during connection and disconnection of the implement 6 from the attachment assembly 4. Specifically, such enhanced stability includes inhibiting of the implement 6 from unwantedly tilting, rotating, or otherwise becoming imbalanced (e.g., with respect to a longitudinal axis extending in a forward/rearward direction) when connecting the implement 6 to the tractor 8 via the attachment assembly 4.

When considered in combination with the lower engagement hooks 20, the plurality of upper engagement hooks 28(*b*), 28(*c*) provide for the attachment assembly 4 to include connection elements that provide at least four points of connection (e.g., when using at least two upper engagement hooks 28(*b*), 28(*c*)) or at least five points of contacted (e.g., when using at least three upper engagement hooks 28(*a*), 28(*b*), 28(*c*)) between the implement 6 and the attachment assembly 4 and/or the tractor 8. As such, the attachment assembly 4, provides enhanced stability to the implement 6, as was noted above and as will be discussed in more detail below.

Figure 10:
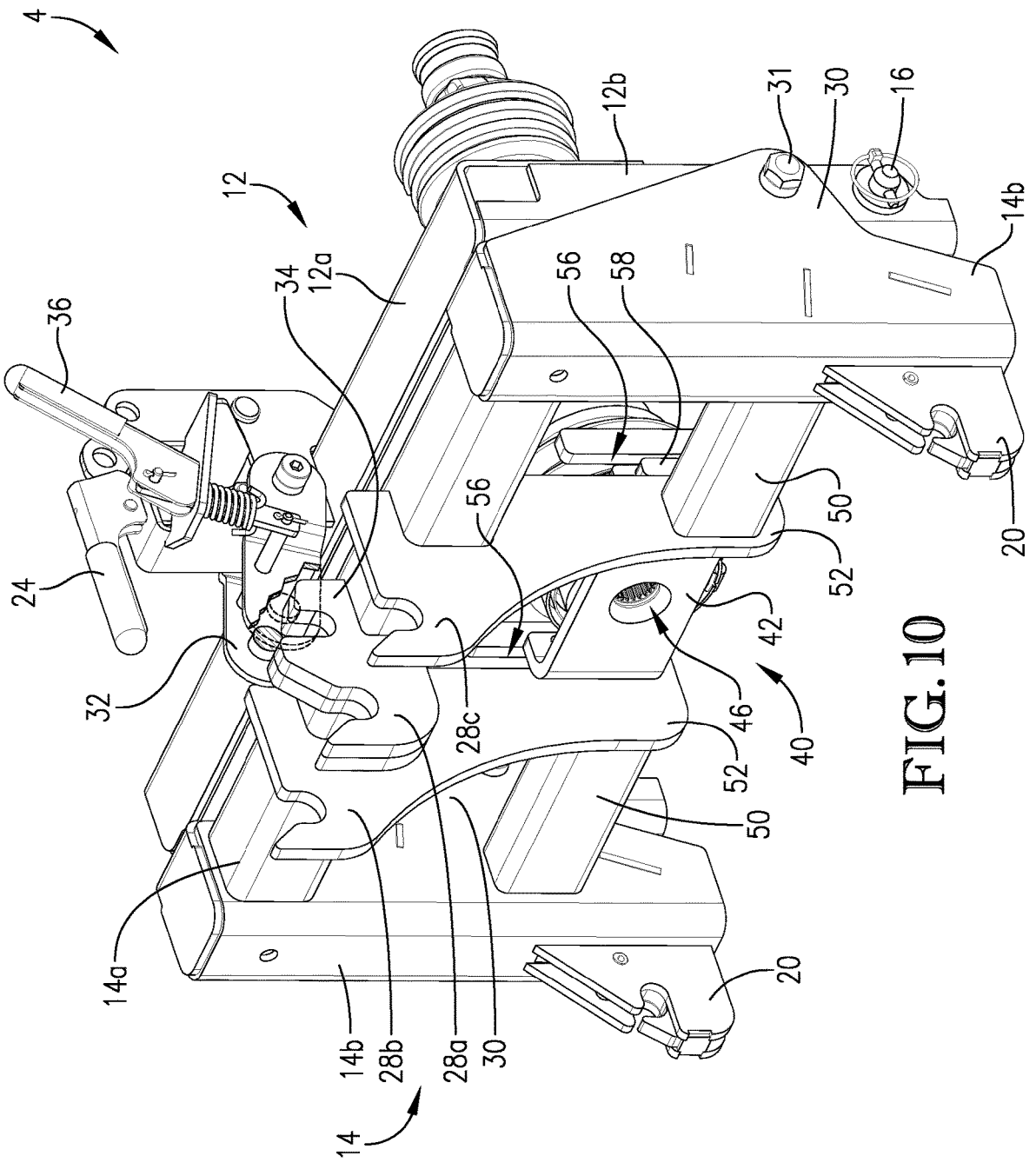
FIG. 10 is a rear perspective view of the attachment assembly from FIGS. 5-8, with a frame release assembly illustrated in an unlocked position.
Figure 11:
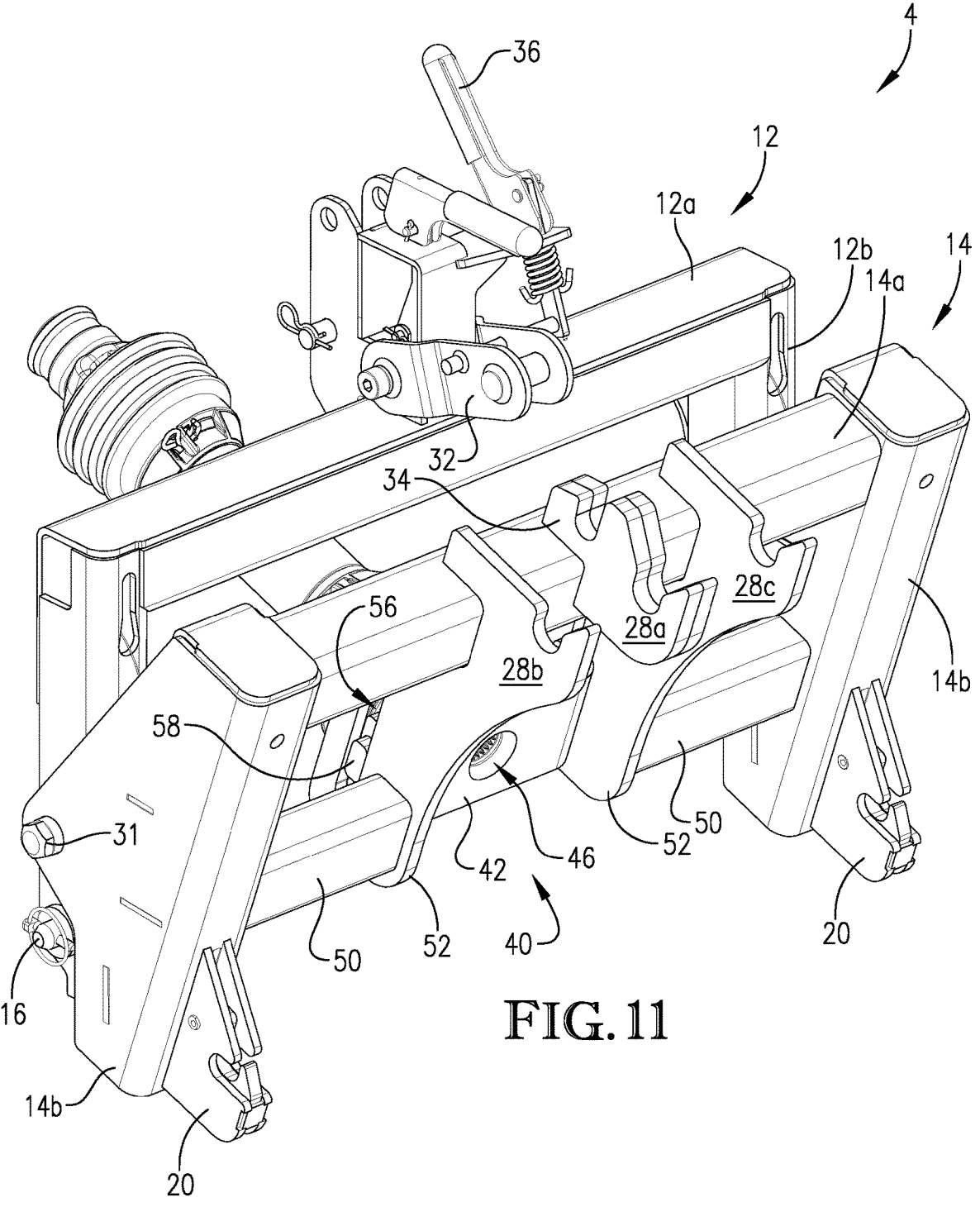
FIG. 11 is a rear perspective view of the attachment assembly from FIG. 10, with the frame release assembly in the unlocked position and the attachment assembly illustrated in an open configuration.

In some embodiments, the implement-side frame 14 may be pivotably secured to the tractor-side frame 12. As such, the implement-side frame 14 can pivot from a position adjacent to the tractor-side frame 12 (i.e., such that the attachment assembly 4 is in a closed configuration), to a position in which the implement-side frame 14 is rotated away from the tractor-side frame 12 (i.e., such that the attachment assembly 4 is in an open configuration). FIG. 7 illustrates the attachment assembly 4 in the closed configuration. FIG. 10 illustrates the attachment assembly 4 being unlocked, such that the attachment assembly 4 can be transitioned from the closed configuration to the open configuration. FIG. 11 illustrates the attachment assembly 4 in the open configuration.

In more detail, and as perhaps best shown in FIGS. 5-8, each of the side bars 14*b* of the implement-side frame 14 may be formed with a pair of parallel pivot support plates 30 that extend rearward toward side bars 12*b* of the tractor-side frame 12. The pivot support plates 30 may, in some embodiments, form side panels of the side bars 14*b*. Each pair of pivot support plates 30 may be spaced apart a sufficient distance so as to receive one of the side bars 12*b* of the tractor-side frame 12 therebetween (See FIGS. 5 and 6). As such, a support pin 31 may extend between each pair of pivot support plates 30 and the corresponding side bar 12*b* so as to secure the implement-side frame 14 to the tractor-side frame 12 in a pivotable manner. Specifically, the support pins 31 may present an axis about which the implement-side frame 14 can pivot or rotate with respect to the tractor-side frame 12 (e.g., between the closed and open configurations). For example, as shown in FIG. 7, the attachment assembly 4 is in the closed configuration, with the implement-side frame 14 positioned adjacent to the tractor-side frame 12, and with both the implement-side frame 14 and the tractor-side frame 12 oriented generally parallel with each other (e.g., each being orientated generally vertically). In contrast, as shown in FIG. 11, the attachment assembly 4 is in the open configuration, with the implement-side frame 14 (or at least an upper portion of the implement-side frame 14) rotated rearward, away from the tractor-side frame 12, such that the implement-side frame 14 is oriented at an angle with respect to the tractor-side frame 12. In some embodiments, the angle may be between 5 and 60 degrees, between 10 and 50 degrees, about 20 degrees, about 30 degrees, or about 45 degrees.

Certain embodiments may provide for the attachment assembly 4 to be securely maintained in the closed configuration. For example, as shown in FIGS. 7, 10, and 11, the attachment assembly 4 may include a frame release assembly that includes a frame latch element 32 extending from the upper bar 12*a* of the tractor-side frame 12. In some embodiments, the frame latch element 32 may be rotatably secured to the securing plates 19, which were previously described. The frame latch element 32 may be configured to be selectively received within a frame hook element 34 (which may also form part of the frame release assembly) extending from the upper bar 14*a* of the implement-side frame 14. In some embodiments, the frame hook element 34 may be formed from the same piece of material as the upper engagement hook 28*a*. Nevertheless, the frame release assembly may additionally include a frame release lever 36, which is rigidly secured to the frame latch element 32, and which can be used to actuate the frame latch element 32 (1) into engagement with the frame hook element 34 so as to lock the attachment assembly 4 in the closed configuration (i.e., with the implement-side frame 14 locked in a position adjacent to the tractor-side frame 12), or (2) out of engagement with the frame hook element 34 so as to unlock the attachment assembly 4 to permit the implement-side frame 14 to rotate away (e.g., rearward) from the tractor-side frame 12 such that the attachment assembly 4 is in the open configuration. As noted previously, FIG. 7 illustrates the frame release assembly in the locked position, with the attachment assembly 4 being securely locked in the closed configuration. FIG. 10 illustrates the frame release assembly in the unlocked position, such that the attachment assembly 4 is free to shift from the closed configuration to the open configuration. FIG. 11 illustrates the frame release assembly in the unlocked position, with the attachment assembly 4 having been shifted to the open configuration.

In certain embodiments, the attachment assembly 4 will additionally include a PTO adapter 40, as shown in FIGS. 6-8, which can be used to facilitate connection between the PTO drive system of the tractor 8 with the PTO receiving system of the implement 6. In more detail, the PTO adapter 40 may include an adapter plate 42 configured to securely receive a PTO connection assembly 43 from the PTO drive system of the tractor 8 and to facilitate connection with a PTO driveline 44 from the PTO receiving system of the implement 6 (See FIG. 12 for an illustration of the tractor's 8 PTO connection assembly 43 and the implement's 6 PTO driveline 44). In more detail, as perhaps best shown in FIG. 6, the PTO adapter 40 may include an adapter cup 45 extending forward from the adapter plate 42. The adapter cup 45 may be concentrically aligned with an opening 46 that extends through the adapter plate 42. The adapter cup 45 may be welded to or may be integrally formed with the adapter plate 42.

Embodiments may provide for the PTO connection assembly 43 of the tractor 8 to be secured to the attachment assembly 4 via securement to the adapter plate 42. In some embodiments, the PTO connection assembly 43 of the tractor 8 may include one or more extension components that extend rearward from the tractor's 8 PTO stub. Although the PTO stub is not shown in the drawings, the PTO connection assembly 43 is illustrated generally extending from the tractor 8 in FIG. 12. A distal end of the PTO connection assembly 43 may be secured to the adapter plate 42 via connection with the adapter cup 45, as is shown in FIG. 5. The PTO connection assembly 43 may be securely held in place in or on the adapter cup 45 via a snap ring 47 or other similar mechanism, as shown in FIGS. 5, 6, and 8. In addition, a cover of the PTO connection assembly 43 may be secured to the adapter cup 45 via a clasp 49. As perhaps best shown in FIG. 8, the distal end of the PTO connection assembly 43 may include a U-joint 48 with a female mating portion (e.g., a receiving opening) directed towards the attachment assembly 4 when the PTO connection assembly 43 is secured to the PTO adapter 40. The female mating portion of the U-joint 48 may be aligned with the opening 46 of the adapter plate 42, as illustrated in FIG. 6, such that, as will be described in more detail below, the PTO driveline 44 of the implement 6 can be inserted through the opening 46 of the PTO adapter 40 and into engagement with the U-joint 48 of the PTO connection assembly 43 of the tractor 8. Thus, the PTO receiving system of the implement 6 can be connected with the PTO drive system of the tractor 8, such that the implement 6 can receive rotary power from the tractor 8.

As shown in FIGS. 6-8, the PTO adapter 40 may, in some embodiments, be secured to the implement-side frame 14 via a pair of lateral supports 50 that extend inward from the side bars 14b, and/or a pair of vertical supports 52 that extend downward from the upper bar 14a. The lateral supports 50 may extend inwards such that free ends of the lateral supports 50 are spaced apart a sufficient distance to receive the PTO adapter 40 therebetween. In some embodiments, the vertical supports 52 may extend downward over the free ends of the lateral supports 50, yet may remain spaced apart a sufficient distance to receive the PTO adapter 40 therebetween. Specifically, inner surfaces of each of the lateral supports 50 and/or the vertical supports 52 may include receiving grooves 56 (See FIGS. 6 and 8) configured to receive protrusions 58 or "keys" that extend laterally from the lateral sides of the adapter plate 42. Specifically, as shown in the figures, the receiving grooves 56 may comprise generally vertical cutouts or slots formed in the vertical supports 52. Such receiving grooves may be particularly configured to receive the protrusions 58 extending from either side of the adapter plate 42. Embodiments provide for the protrusions 58 may be elongated rectangles, or may be oval shaped, and may extend from forward extending flanges that project forward from either lateral side of the adapter plate 42 (See, e.g., FIG. 6).

As such, the PTO adapter 40 can be selectively engaged with the implement-side frame 14 by inserting (e.g., by sliding) the protrusions 58 of the PTO adapter 40 within the receiving grooves 56 formed in the vertical supports 52, as is shown in FIG. 7. Specifically, tops of the receiving grooves 56 may be open so as to receive the protrusions 58 of the adapter plate 42. With the adapter plate 42 engaged with the vertical supports 52, the PTO adapter 40 will generally be orientated in alignment with the implement-side frame 14 (e.g., the PTO adapter 40 and the implement-side frame 14 will each be orientated generally vertically). Specifically, in normal operating conditions, the PTO drive system of the tractor 8 will be secured to the adapter plate 42, and the adapter plate 42 will be engaged with the implement-side frame 14 (i.e., via engagement between the protrusions 58 and the receiving grooves 56). Correspondingly, the PTO receiving system of the implement 6 will pass through the opening 46 of the adapter plate 42 an into engagement with the PTO drive system of the tractor 8 to receive power therefrom. In such a position, as illustrated in FIGS. 5, 7, and 10, the protrusions 58 of the adapter plate 42 will be positioned generally within an upper or central portions of the respective receiving grooves 56 (i.e., within the generally linear, vertically-extending portions of the receiving grooves 56), such that the adapter plate 42 is generally orientated in alignment or in parallel with the implement-side frame 14 (i.e., the adapter plate 42 and the implement-side frame 14 will each be orientated generally vertically).

In certain additional embodiments, the PTO adapter 40 (including the adapter plate 42) and the implement-side frame 14 may be configured to rotate with respect to each other. For instance, the PTO adapter 40 may be configured to at least partly rotate out of alignment with the implement-side frame 14 (e.g., via the engagement of the protrusions 58 within the receiving groves 56). As was described above, the attachment assembly 4 is configured to shift between a closed position and an open position when connecting and disconnecting an implement 6. Specifically, the implement-side frame 14 is configured to rotate rearward, away from the tractor-side frame 12. As such, when the attachment assembly 4 is in the open position, the implement-side frame 14 is not orientated vertically but is orientated at a rearwardly-directed incline. However, the PTO drive system of the tractor 8 will still be engaged with the adapter plate, and generally there is not much positional adjustment capabilities (e.g., "play") with the position/orientation of the PTO drive system. As such, it can be problematic if the adapter plate 42 (which is engaged with the implement-side frame 14) has its orientation changed in a manner corresponding with the implement-side frame 14, as such a change in orientation may interfere with the PTO drive system of the tractor 8.

To address such issues, the receiving grooves 56 formed in the vertical supports 52 may have a bottom portion that is arcuately shaped (instead of generally linearly vertical as with the remaining, upper and central portions of the receiving grooves 56), curving rearward, as shown in FIGS. 6 and 8. Stated differently, upper and central portions of the receiving grooves 56 may extend generally linearly in a vertical direction, whereas lower portions of the receiving grooves 56 may be curved and/or extend at a rearward/downward incline. As such, when the attachment assembly 4 is opened, i.e., by the implement-side frame 14 being rotated rearward as shown in FIG. 11, the receiving grooves 56 can travel along the protrusions 58 of the adapter plate 42 without the adapter plate 42 needing to significantly change its position/orientation. Specifically, the vertical supports 52 of the implement side frame 14 can rotate rearward, such that the lower, arcuate-shaped portions of the receiving grooves 56 can travel upward about the protrusions 58 of the adapter plate 42 such that the protrusions 58 will be positioned within the lower, arcuate-shaped portion of the receiving grooves 56. As a result, the implement-side frame 14 can rotate rearward without the adapter plate 52 needing to significantly change its position/orientation. Thus, the adapter plate 42 can remain in a generally vertical orientation (in alignment with the tractor-side frame 12) to support the PTO drive system of the tractor 8 even with the attachment assembly 4 opened (i.e., with the implement-side frame 14 rotated rearwardly). Stated differently, the PTO drive system of the tractor 8 can remain connected to the attachment assembly 4 (including to the PTO adapter 40) as the attachment assembly 4 is selectively opened and closed to attach/detach to/from various implements 6.

To facilitate connection of various sizes of PTO drive systems, the attachment assembly 4 may include multiple PTO adapters 40, each being formed with various sized adapter cups 45 and/or adapter openings 46. The various PTO adapters 40 can be selectively removed from and inserted into the implement-side frame 14 by, respectively, removing and inserting the protrusions 58 of the PTO adapters 40 within the receiving notches 56 formed in the lateral supports 50 and/or the vertical supports 52.

In operation, the attachment assembly 4 can be used to quickly and efficiently operably connect an implement 6 to a tractor 8. Beneficially, as noted above, the attachment assembly 4 is configured to connect the PTO drive system of the tractor 8 with the PTO receiving system of the implement 6, such that the tractor 8 can provide rotary power to the implement 6. In more detail, the attachment assembly 4 will be secured to the tractor 8 by connecting the tractor-side frame 12 of the attachment assembly 4 to the three-point hitch 15 of the tractor 8. Specifically, as shown in FIGS. 1-4 and 12, the lifting arms 15a of the three-point hitch 15 can be inserted into the bases of the side bars 12b, as was previously described, and secured to the side bars 12b via the lower hitch pins 16. In addition, the upper bar 12a of the tractor-side frame 12 may be secured to the upper link 15b of the three-point hitch 15 by inserting the upper hitch pin 18 simultaneously through the parallel securing plates 19 of the attachment assembly 4 and the upper link 15b of the three-point hitch 15. As was noted previously, however, in certain embodiments, the attachment assembly 4 may be permanently secured to and/or integrated with the tractor 8. For example, the tractor-side frame 12 may be permanently secured to and/or may form part of the rear end of the tractor 8, such that the attachment assembly 4 extends rearward from the rear end of the tractor 8. Finally, the PTO connection assembly 43 of the tractor's 8 PTO drive system will be engaged with the PTO adapter 40 of the attachment assembly 4, as was described previously. Specifically, as shown in FIG. 5, a distal end of the PTO connection assembly 43 will be securely engaged with the PTO adapter cup 45 engaged with the implement-side frame 14. In such a configuration, the female mating portion of the PTO connection assembly's 43 U-joint 48 will be aligned with the opening 46 formed through the adapter plate 42 of the PTO adapter 40 (See FIGS. 7 and 8).

Figure 12:
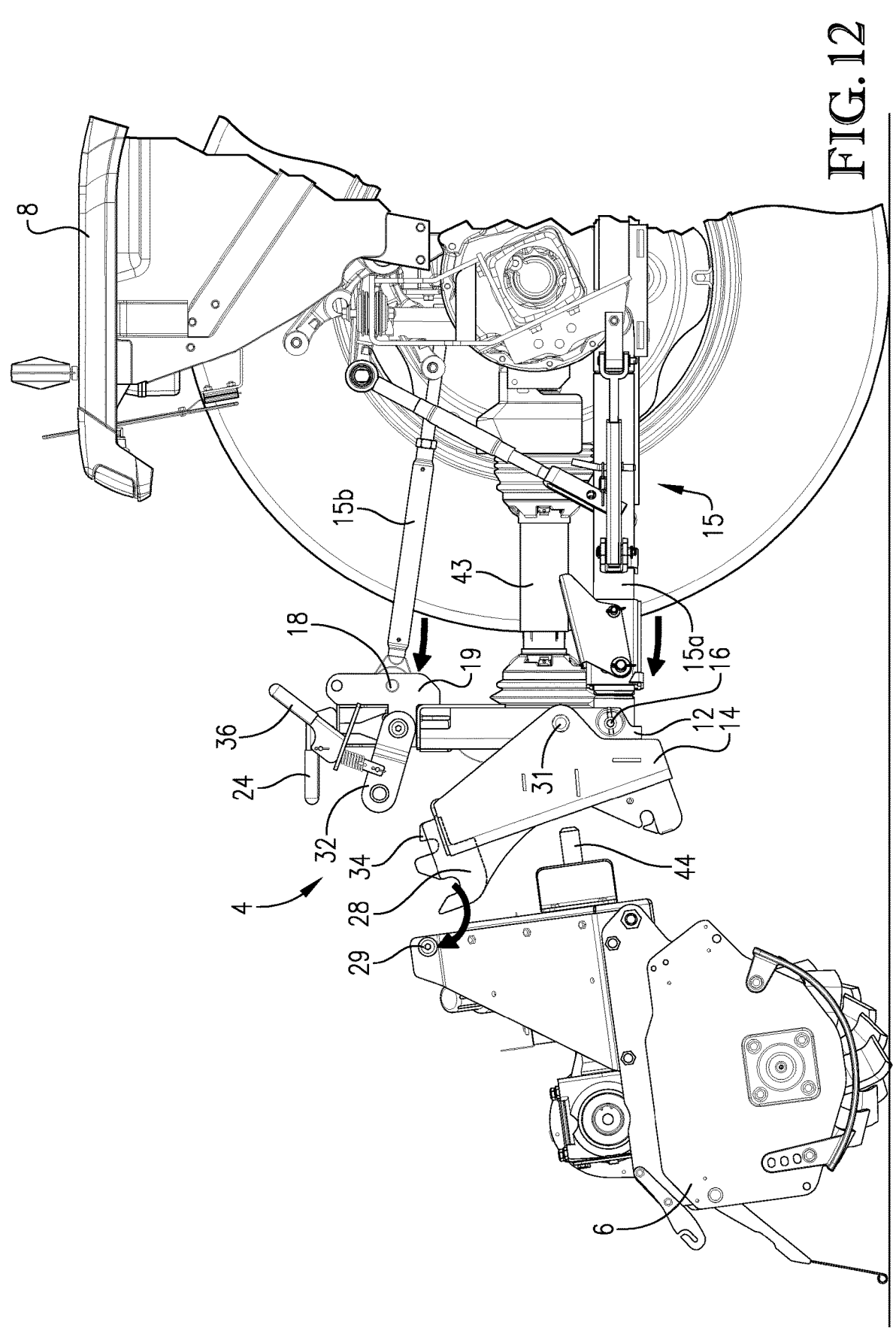
FIG. 12 is a side elevation view of an attachment assembly according to embodiments of the present invention being shown secured to a tractor and engaging with an implement.

In general use, the attachment assembly 4 may be secured to the tractor 8 with the attachment assembly 4 being in the closed configuration (i.e., with the implement-side frame 14 secured in position adjacent to the tractor-side frame 12 via the frame release assembly). However, in some embodiments, the attachment assembly 4 may be secured to the tractor 8 while in the open configuration. Nevertheless, to secure an implement 6 to the tractor 8 via the attachment assembly 4, the attachment assembly 4 is generally required to be shifted to the open configuration, as illustrated in FIG. 12. To accomplish such shifting, an operator of the tractor 8 may actuate the frame release lever 36 such that the frame latch element 32 of the tractor-side frame 12 is released from the frame hook element 34 on the implement-side frame 14. Beneficially, due to the position of the frame release lever 36 being positioned on the top bar 12a of the tractor-side frame 12 of the attachment assembly 4, actuation of the frame release lever 36 can be performed by the operator of the tractor 8 while the operator remains positioned on the tractor 8 (e.g., while sitting in the operating seat or while standing adjacent the operating seat of the tractor 8). As such, the operator may not be required to step off or down from the tractor 8 to perform the various method steps described herein.

Due to the release of the frame release assembly, the implement-side frame 14 can be rotated rearwardly, or can fall rearward under its own weight, away from the tractor-side frame 12, as is shown in FIG. 12. Specifically, the implement-side frame 14 can rotate rearwardly about the support pins 31 that secure the pivot support plates 30 of the implement-side frame 14 to the side bars 12b of the tractor-side frame 12, as was previously described and illustrated. Beneficially, because the PTO adapter 40 is configured to rotate with respect to the implement-side frame 14, the implement-side frame 14 can rotate rearwardly away from the tractor-side frame 12 without interfering or otherwise causing problems with the connection between the PTO connection assembly 43 of the tractor 8 and the PTO adapter 40 of the attachment assembly 4 (such rotation of the PTO adapter 40 is illustrated in FIG. 11).

Figure 13:
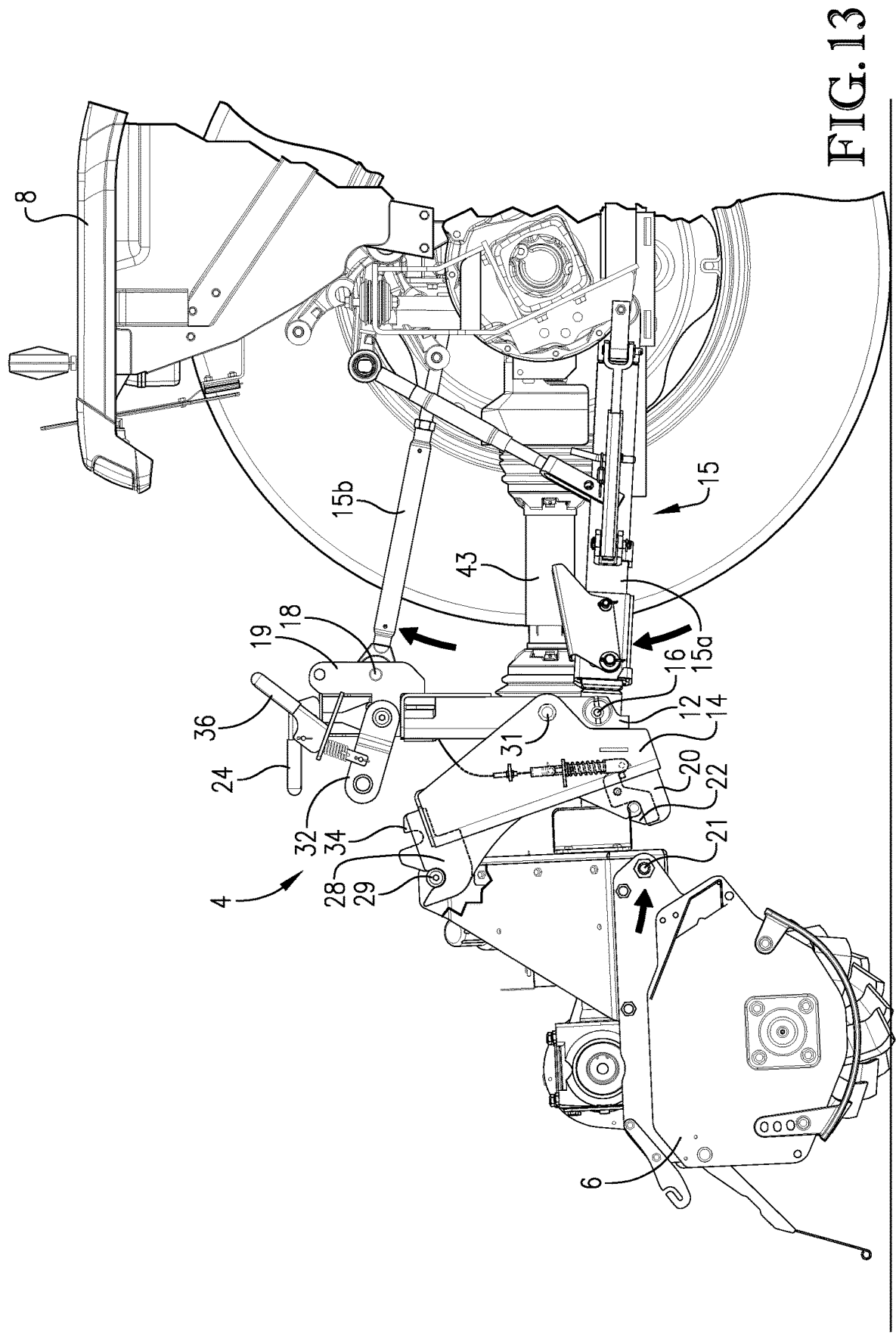
FIG. 13 is a side elevation view of the attachment assembly, the tractor, and the implement from FIG. 12, with an upper portion of the attachment assembly being engaged with and beginning to lift the implement off the ground.

As a next step in attaching the attachment assembly 4 to the implement 6, the attachment assembly 4 will be positioned directly in front of the implement 6, with the rear of the implement-side frame 14 facing the implement 6. Such positioning can be performed via maneuvering of the tractor 8. Thereafter, as illustrated in FIG. 13, the attachment assembly 4 can be actuated (e.g., raised by the three-point hitch 15) until each of the upper engagement hooks 28a, 28b, 23c engage with the upper hitch pin 29 of the implement 6. As was noted previously, the upper hitch pin 29 will generally have a sufficient length to be simultaneously received in each of the upper engagement hooks 28a, 28b, 23c. As a result (and particularly due to the multiple points of connection provided by the upper engagement hooks 28a, 28b, 23c for the upper hitch pin 29), the attachment assembly 4 can provide enhanced stability to the implement 6 by inhibiting of the implement 6 from unwantedly tilting, rotating, or otherwise becoming imbalanced (e.g., with respect to a longitudinal axis extending in a forward/rearward direction) during connection of the implement 6 to the attachment assembly 4 and/or the tractor 8.

Figure 14:
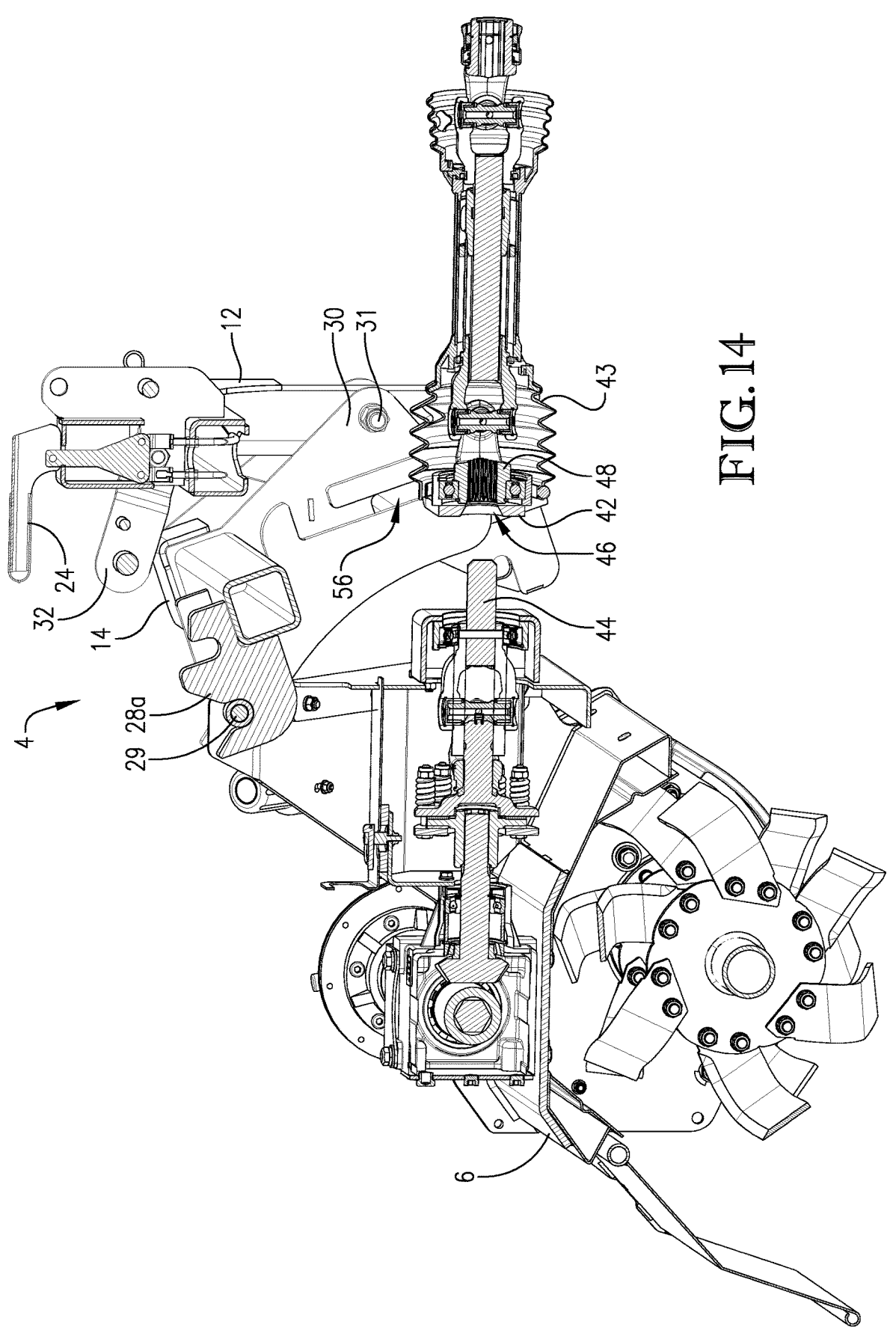
FIG. 14 is a cross-section view of the attachment assembly, a portion of the tractor, and the implement from FIG. 13, illustrating a power-take off (PTO) driveline of the implement being in alignment with the attachment assembly and a PTO connection assembly of the tractor.

Simultaneous with the connection of the implement 6 and the upper engagement hooks 28a, 28b, 23c, the PTO driveline 44 will be aligned with the opening 46 of the PTO adapter 40, such that the PTO driveline 44 can be inserted through the opening 46 and (at least partially) into engagement with the PTO connection assembly 43 extending from the tractor 8, as is shown in FIG. 14. In more detail, the attachment assembly 4 will be actuated vertically (by the three-point hitch 15) and/or horizontally (e.g., via movement of the tractor 8) until the upper engagement hooks 28a, 28b, 28c all engage with the upper hitch pin 29 and, simultaneously, the PTO driveline 44 can be aligned with and/or can be at least partially engaged with the PTO connection assembly 43 extending rearward from the tractor 8. Specifically, as shown in FIG. 14, the attachment assembly 4 may begin to be engaged with the implement 6 so as to provide for the PTO driveline 44 to be properly aligned with the opening 46 formed through the PTO adapter 40 and with the U-joint 48 of the tractor's 8 PTO connection assembly 43. It is understood that such engagement between the implement 6 and the attachment assembly 4 may be performed while the attachment assembly 4 is in the open configuration (i.e., with the implement-side frame 14 rotated rearwardly away from the tractor-side frame 12, as is shown in FIG. 13).

Specifically, as was described above, even with the attachment assembly 4 in the open position with the implement-side frame 14 rotated rearwardly away from the tractor-side frame 12, each of the tractor-side frame 12 and the PTO adapter 40 (including the adapter plate 42) can have their orientations remain in general alignment (e.g., vertically) so as to maintain proper connection between the PTO connection assembly 43 and the attachment assembly 4. As such, when the attachment assembly 4 is opened, i.e., by the implement-side frame 14 being rotated rearward as shown in FIG. 14, the receiving grooves 56 can travel up along the protrusions 58 of the adapter plate 42 without the adapter plate 42 needing to significantly change its position/orientation. Specifically, the vertical supports 52 of the implement side frame 14 can rotate rearward, such that the lower, arcuate-shaped portions of the receiving grooves 56 can travel upward about the protrusions 58 of the adapter plate 42 such that the protrusions 58 will be positioned within the lower, arcuate-shaped portion of the receiving grooves 56. As a result, the implement-side frame 14 can rotate rearward without the adapter plate 52 needing to significantly change its position/orientation. Thus, the adapter plate 42 can remain in a generally vertical orientation (in alignment with the tractor-side frame 12) to support the PTO drive system of the tractor 8 even with the attachment assembly 4 opened (i.e., with the implement-side frame 14 rotated rearwardly). Stated differently, the PTO drive system of the tractor 8 can remain connected to the attachment assembly 4 (including to the PTO adapter 40) as the attachment assembly 4 is selectively opened and closed to attach/detach to/from various implements 6.

Figure 15:
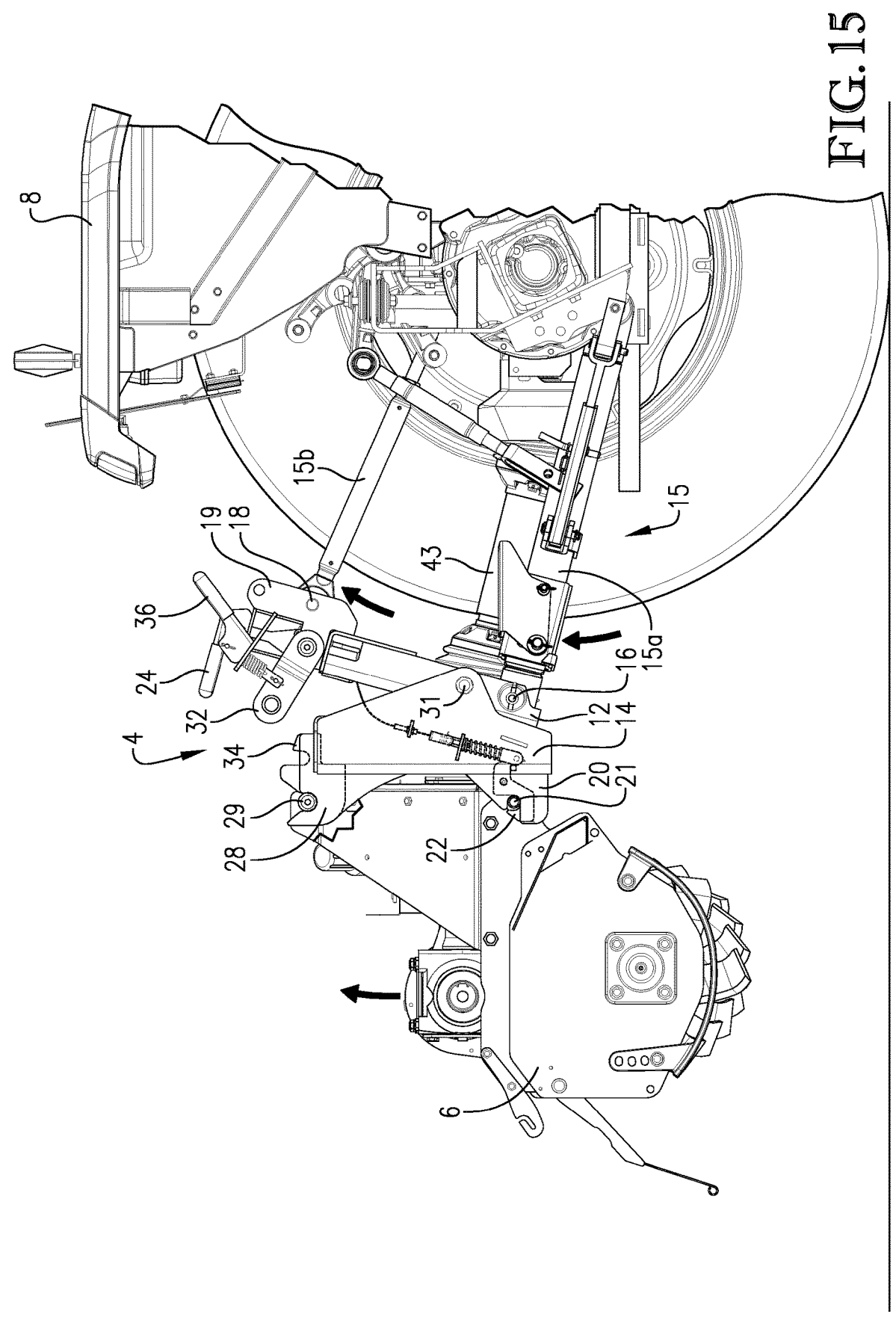
FIG. 15 is a side elevation view of the attachment assembly, the tractor, and the implement from FIGS. 12 and 13, with the implement lifted off the ground such that a lower portion of the implement can be engaged with the attachment assembly.

Next, as illustrated in FIG. 15, the attachment assembly 4 will be raised via the three-point hitch 15 of the tractor 8, so as to lift the implement 6 off the ground by way of the engagement between the upper engagement hooks 28*a*, 28*b*, 28*c* and the upper hitch pin 29 of the implement 6. The lifting of the implement will cause lower portions of the implement 6 to rotate forward (towards the implement-side frame 14) about the upper hitch pin 29, such that the lower hitch pins 21 of the implement 6 are forced into engagement with the lower engagement hooks 20 of the implement-side frame 14. The implement release assembly will be in the locked position (i.e., with the implement release levers 24 in the downward, locked position), such that the implement latch elements 22 will function to securely hold the lower hitch pins 21 of the implement 6 within the lower engagement hooks 20. It should be understood that such locking of the lower hitch pins 21 within the lower engagement hooks 20 can be performed even when the implement release assembly is in the locked configuration. As was described above, the shape of the implement latch elements 22 (and the use of the biasing elements 27 in the linkage assembly 26) permits the lower hitch pins 21 of the implement 6 to be inserted within the lower engagement hooks 20 (and securely held therein) even while the implement release assembly is in the locked configuration. Upon such engagement between the implement 6 and the implement-side frame 14 of the attachment assembly 4, the implement 6 will be securely engaged with upper and lower portions of the attachment assembly 4 via connection between (1) the upper engagement hooks 28*a*, 28*b*, 28*c* of the implement-side frame 14 and the upper hitch pin 29 of the implement 6, and (2) the lower engagement hooks 20 of the implement-side frame 14 and the lower hitch pins 21 of the implement 6.

It should be noted that the complete connection between the implement 6 and the implement-side frame 14 may also require a complete engagement with the PTO driveline 44 of the implement 6 and the PTO connection assembly 43 of the tractor 8. Such connection may require the implement 6 to be lowered to the ground, as illustrated in FIG. 16, such that the attachment assembly 4 can be shifted to the closed configuration and the PTO driveline 44 can be fully engaged within the PTO connection assembly 43.

Figure 16:
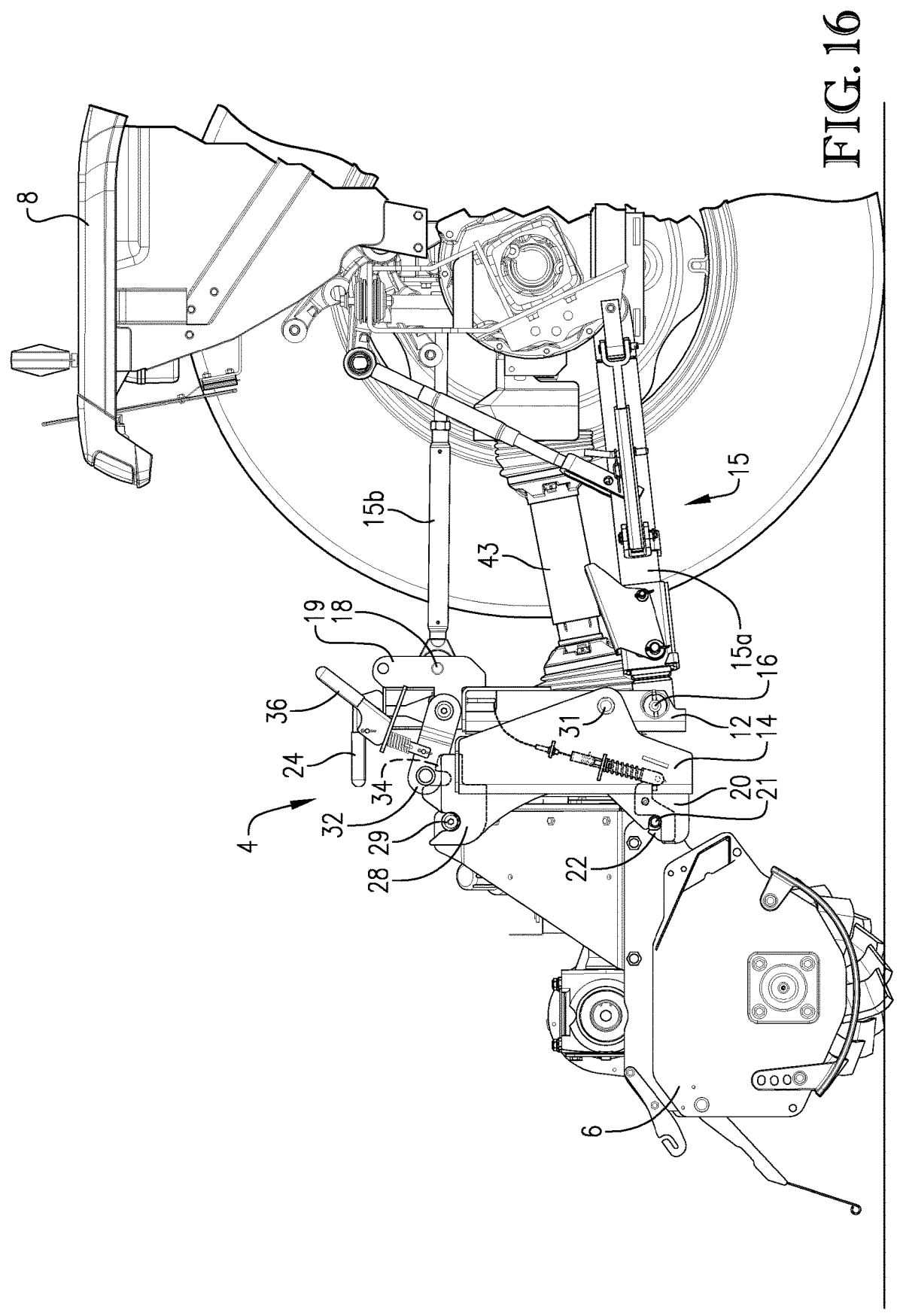
FIG. 16 is a side elevation view of the attachment assembly, the tractor, and the implement from FIGS. 12, 13, and 15, with the implement being lowered to the ground and the attachment assembly being shifted from an open configuration to a closed configuration.
Figure 17:
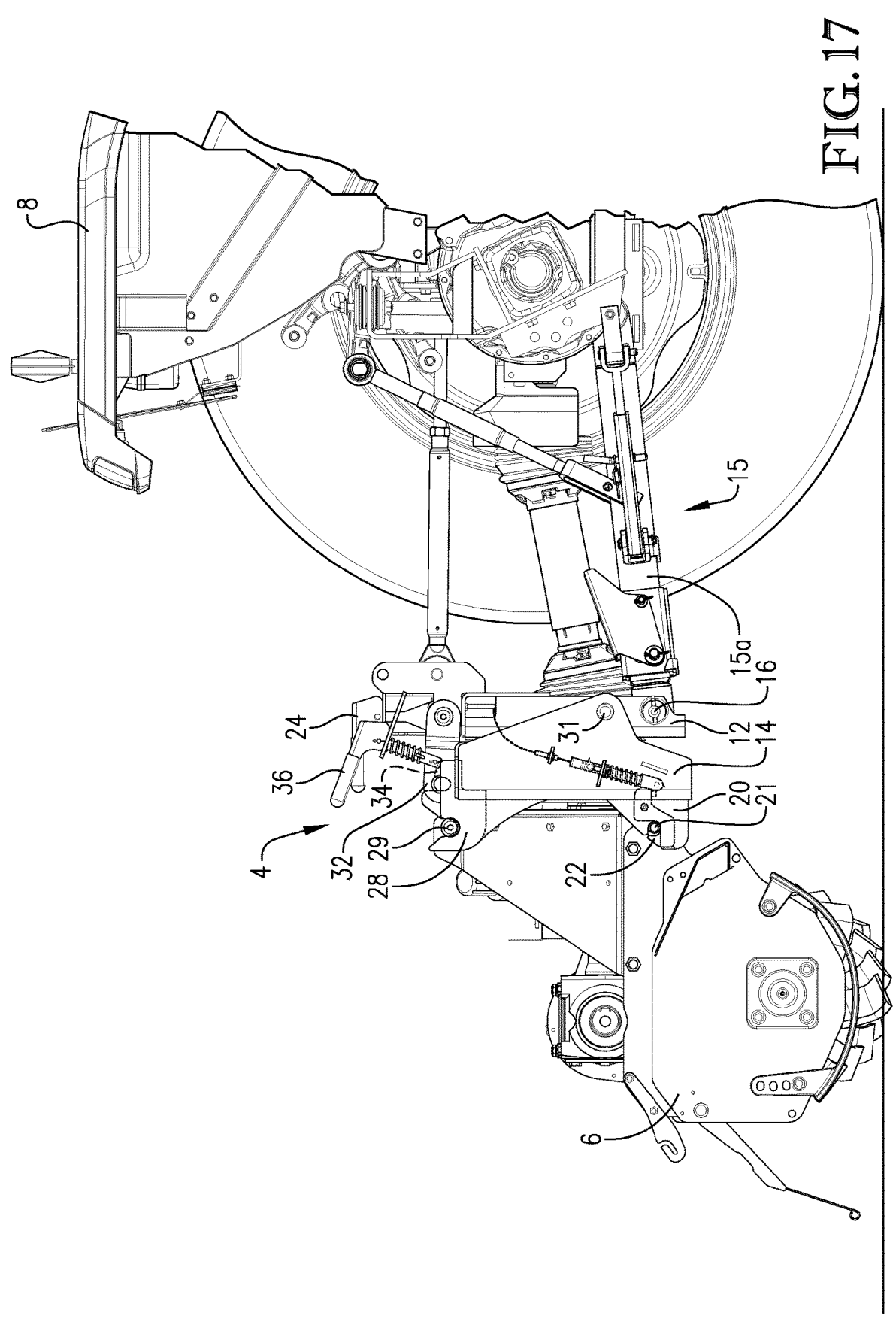
FIG. 17 is a side elevation view of the attachment assembly, the tractor, and the implement from FIGS. 12, 13, 15 and 16, with the attachment assembly being shown locked in the closed configuration via a frame release assembly.
Figure 18:
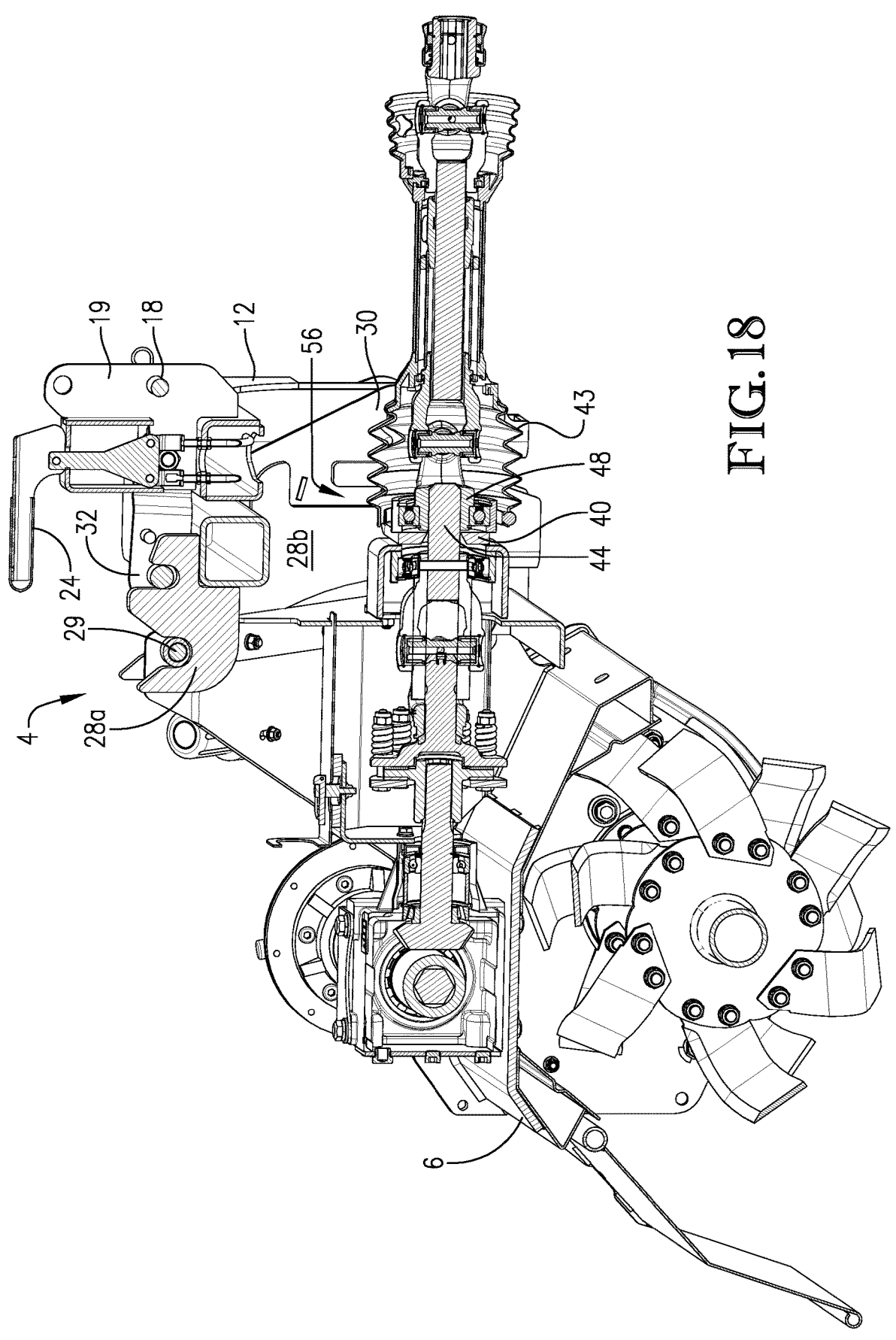
FIG. 18 is a cross-section view of the attachment assembly, a portion of the tractor, and the implement from FIG. 17, illustrating a power-take off (PTO) driveline of the implement being engaged with the attachment assembly and with a PTO connection assembly of the tractor.

In more detail, the attachment assembly 4 (via the three-point hitch 15) may be lowered until the implement 6 contacts the ground, as shown in FIG. 16. Upon the implement 6 contacting the ground, the implement-side frame 14 may be forced forward, rotating about the support pins 31, until the attachment assembly 4 is in the closed configuration with the implement-side frame 14 adjacent to the tractor-side frame 12. The attachment assembly 4 can be locked in the closed configuration by actuating the frame release lever 36, as shown in FIG. 17, such that the frame latch element 32 of the tractor-side frame 12 engages with the frame hook element 34 on the implement-side frame 14. As noted above, such actuation of the frame release lever 36 may generally be performed by the operator, while the operator remains positioned on the tractor 8 (e.g., while sitting in the operating seat or while standing adjacent the operating seat of the tractor 8). As such, the operator may not be required to dismount the tractor 8 to complete the connection of the implement 6 with the tractor 8. Beneficially, with the implement 6 securely engaged with the attachment assembly 4, and with the attachment assembly 4 in the closed configuration, the PTO driveline 44 of the implement 6 will be fully engaged, as shown in FIG. 18, within the female mating portion of the U-joint 48 of the PTO connection assembly 43 extending from the tractor 8. As was previously described, such engagement is facilitated via the PTO adapter 40 of the attachment assembly 4, which ensures proper alignment between the PTO driveline 44 of the implement 6 with the PTO connection assembly 43 of the tractor 8.

With the attachment assembly 4 in the closed configuration, as shown in FIG. 17, the implement 6 will be securely held in engagement to the three-point hitch 15 of the tractor 8 via the attachment assembly 4. As such, the tractor 8 can maneuver wherever needed, while pulling the implement 6 behind to perform intended operations. Beneficially, the attachment assembly 4 also facilitates connection between the PTO drive system of the tractor 8 and the PTO receiving system of the implement 6. Thus, rotary power can be provided by the tractor 8 to the implement 6 via the attachment assembly 4. As an example, the figures illustrate an implement 6 in the form of a tiller. The tiller is shown securely attached to the rear of the tractor 8 via the attachment assembly 4, which securely engages with the front of the tiller and the three-point hitch 15 of the tractor 8. As such, the tractor 8 can pull the tiller where needed. In addition, the attachment assembly 4 facilitates connection between the PTO drive system of the tractor 8 and the PTO receiving system of the tiller, such that as the tiller is being pulled, the tractor 8 can impart rotary power to the tiller so that the tiller can perform tiller operations (e.g., the tiller's blades can be caused to rotate).

Figure 19:
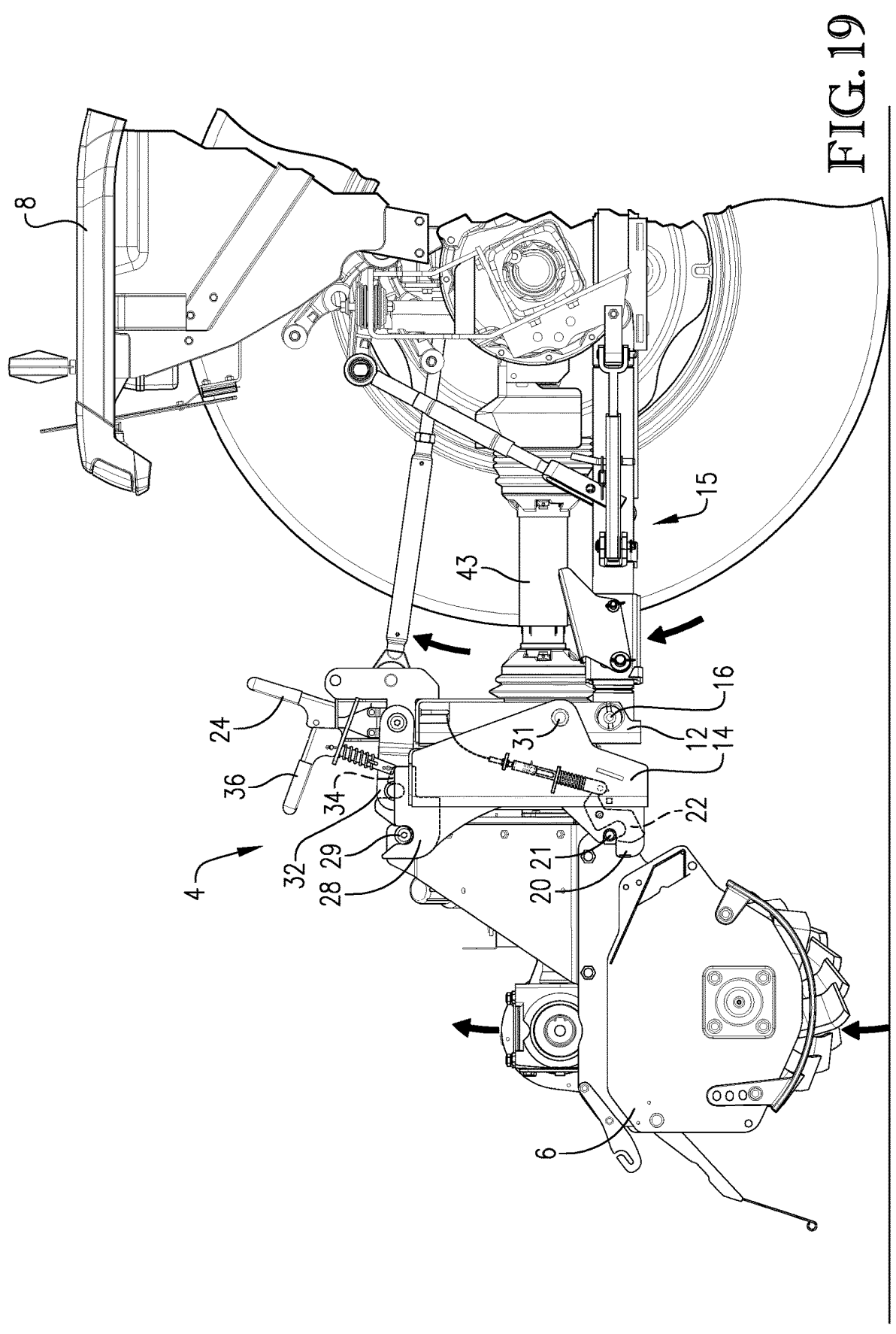
FIG. 19 is a side elevation view of the attachment assembly, the tractor, and the implement from FIGS. 12, 13, and 15-17, with the implement being raised off the ground and an implement release assembly of the attachment assembly being unlocked to permit disengagement of the bottom of the implement from the attachment assembly.
Figure 20:
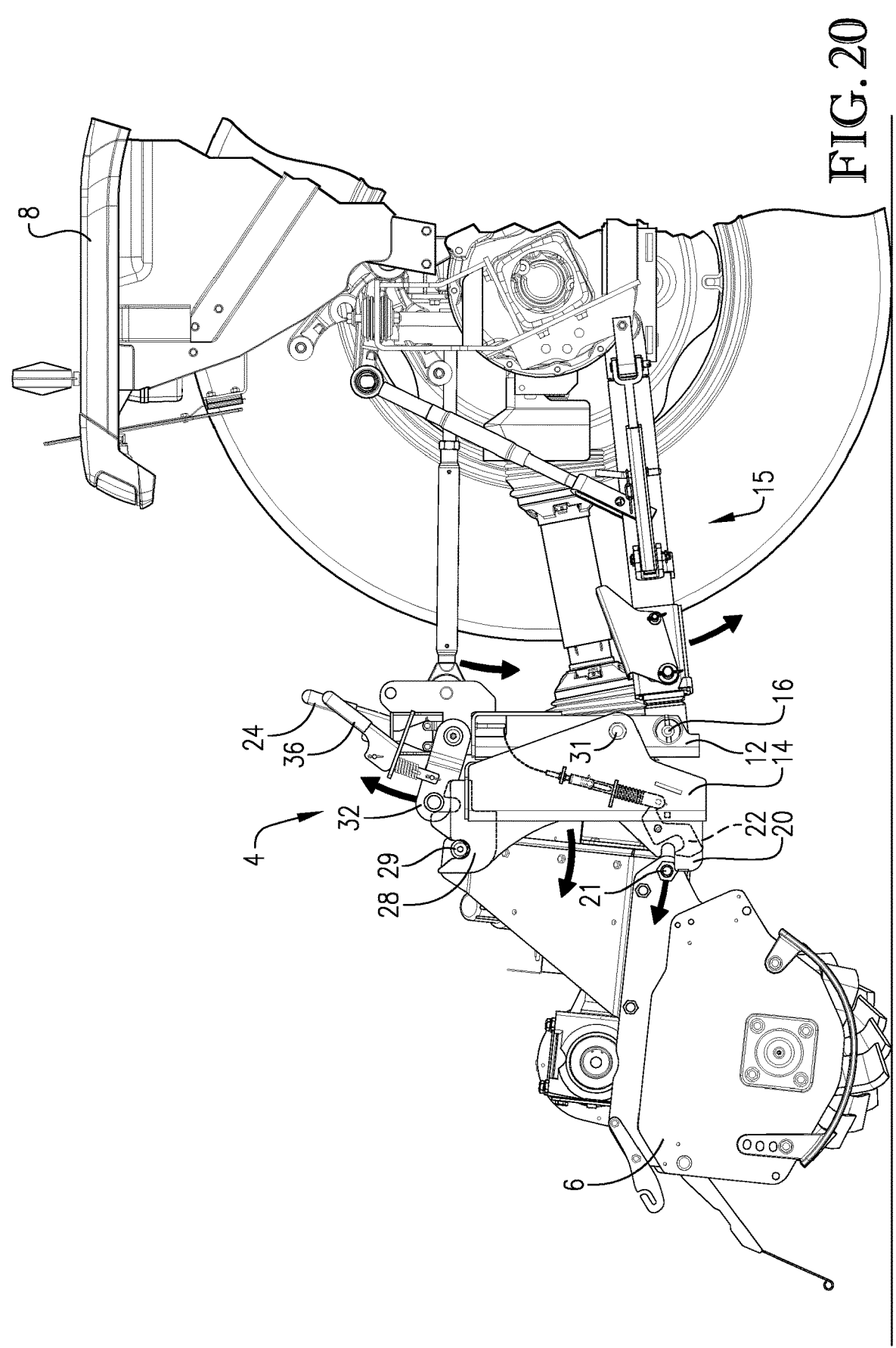
FIG. 20 is a side elevation view of the attachment assembly, the tractor, and the implement from FIGS. 12, 13, 15-17, and 19, with the implement being lowered back to the ground and the frame release assembly being unlocked such that the attachment assembly can shift from the closed configuration to the open configuration.

To remove the implement 6 from the tractor 8, the operator can raise the implement 6 off the ground and actuate the implement release lever 24, as shown in FIG. 19, so as to unlock the implement latch elements 22 of the implement release assembly. Beneficially, given the position of the implement release lever 24 (i.e., centrally positioned on the attachment assembly 4 and extending from the upper bar 14*a* of the implement-side frame 14), the operator of the tractor 8 may generally perform actuation of the implement release lever 24 while the operator remains positioned on the tractor 8 (e.g., while sitting in the operating seat or while standing adjacent the operating seat of tractor 8). With the implement 6 raised off the ground, and with the implement latch elements 22 in the unlocked position, the lower hitch pins 21 of the implement 6 can be released from the lower engagement hooks 20 of the implement-side frame 14. In some embodiments, the implement 6 will need to be returned to the ground, as shown in FIG. 20, in order for the lower hitch pins 21 to disengage themselves from the lower engagement hooks 20. Generally, the force of the implement 6 on the ground will cause the implement 6 to rotate rearward such that the lower hitch pins 21 are released from the lower engagement hooks 20.

Upon releasing the lower hitch pins 21 of the implement from the lower engagement hooks 20, and the attachment assembly 4 (still in the closed configuration) lowered into contact with the ground, the frame release lever 36 can be actuated, as illustrated in FIG. 20, so as to release the frame latch element 32 of the tractor-side frame 12 from its engagement with the frame hook element 34 of the implement-side frame 14. As noted previously, such actuation of the frame release lever 36 can be performed by the operator of the tractor 8 while seated in the operating seat of the tractor 8 without needing to dismount the tractor 8. With the frame release assembly releasing the implement-side frame 14 from the tractor-side frame 12, the attachment assembly 4 is free to actuate from the closed configuration to the open configuration (i.e., the implement-side frame 14 can rotate rearward away from the tractor-side frame 12).

Figure 21:
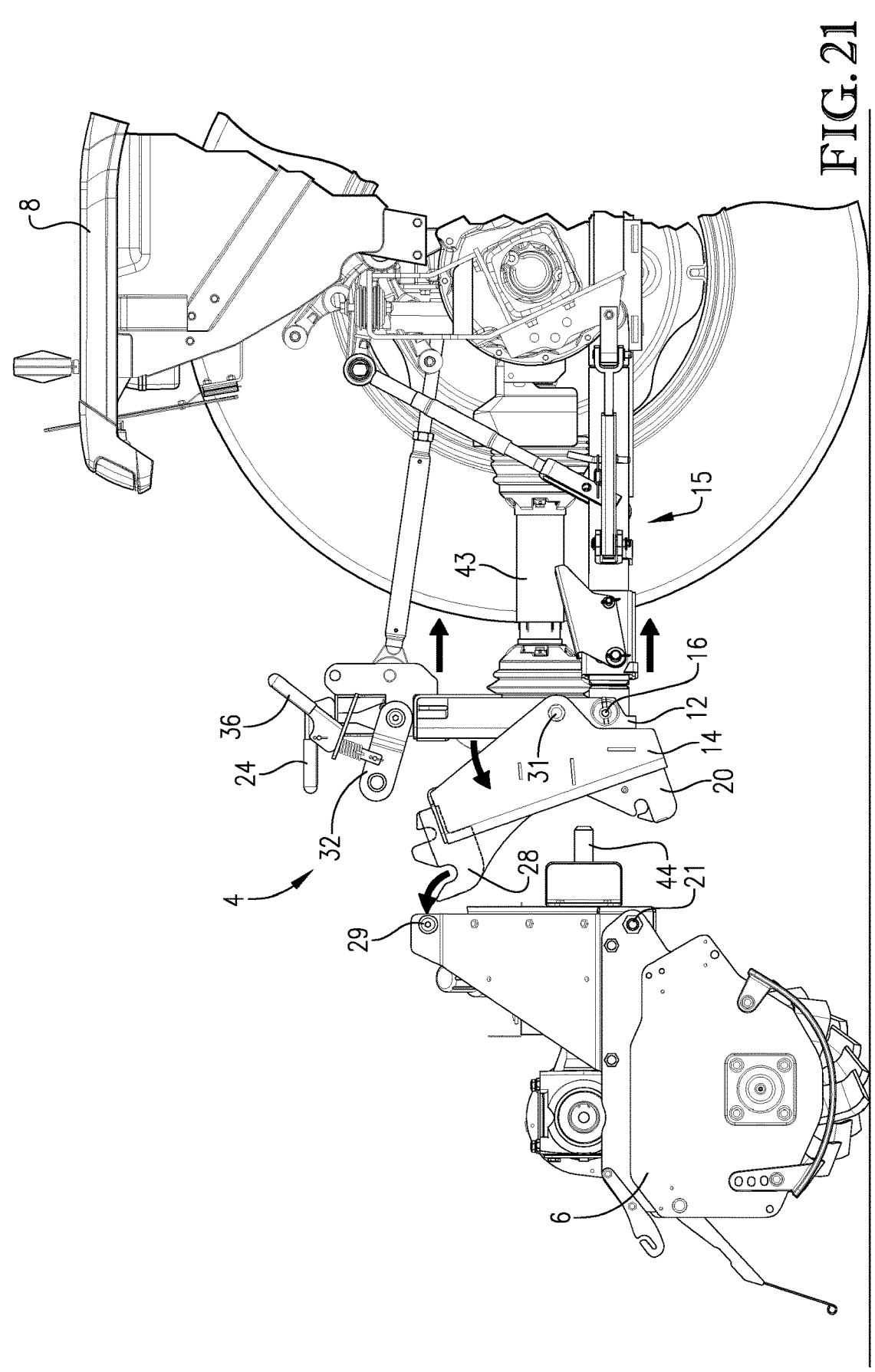
FIG. 21 is a side elevation view of the attachment assembly, the tractor, and the implement from FIGS. 12, 13, 15-17, and 20, with the tractor and the attachment assembly being separated from the implement.

As illustrated in FIG. 21, the attachment assembly 4 being in the open configuration permits the operator to disconnect the implement 6 from the attachment assembly 4. Specifically, as was noted previously, the implement latch elements 22 on the side bars 14*b* of the implement-side frame 14 are unlocked, such that the lower hitch pins 21 of the implement 6 are released from the lower engagement hooks 20 of the attachment assembly 4. Thus, to fully remove the implement 6 from the attachment assembly 4, the operator of the tractor 8 can simultaneously lower the attachment assembly 4 (e.g., by lowering the three-point hitch 15) and pulling the tractor 8 forward, as is shown in FIG. 21. Such a maneuver will extract the upper hitch pin 29 of the implement from the upper engagement hooks 28*a*, 28*b*, 28*c* of the implement-side frame 14. Continuing to pull the tractor 8 forward will also extract the PTO connection assembly 43 of the tractor 8 from the PTO driveline 44 of the implement 6. Thus, the attachment assembly 4 will be free from the implement 6. As such, embodiments provide for the tractor 8 to quickly and efficiently connect with and disconnect from another implement (not shown) by repeating the process described above.

As was described above, even with the attachment assembly 4 in the open position with the implement-side frame 14 rotated rearwardly away from the tractor-side frame 12, each of the tractor-side frame 12 and the PTO adapter 40 (including the adapter plate 42) can have their orientations remain in general alignment (e.g., vertically) so as to maintain proper connection between the PTO connection assembly 43 and the attachment assembly 4. As such, the attachment assembly 4 can be quickly and efficiently be connected to another implement 6, as necessary, without having to re-attach the PTO connection assembly 43 of the tractor 8 with the attachment assembly 4.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An attachment assembly for connecting an agricultural implement to a tractor, said attachment assembly comprising:

a tractor-side frame configured to be removably attached to the tractor and to extend from the tractor; and an implement-side frame configured to be removably attached to the implement, wherein said implement-side frame is configured to rotate with respect to said tractor-side frame, wherein said implement-side frame comprises connection elements configured to attach the implement to said implement-side frame, and wherein said connection elements provide at least four points of connection for the implement, wherein said connection elements include a pair of lower connection elements with each one of the pair positioned on a respective lateral side of the implement-side frame, and wherein said connection elements include at least a pair of upper connection elements centrally positioned between the pair of lower connection elements with respect to a lateral direction, wherein said pair of lower connection elements comprises a pair of lower engagement hooks and wherein said at least a pair of upper connection elements comprises a pair of upper engagement hooks, further comprising a power take-off (PTO) adapter configured to facilitate a rotary-power connection between the tractor and the implement, wherein the PTO adapter is configured to be removably coupled with the implement-side frame, and wherein the PTO adapter is configured to rotate with respect to the implement-side frame.

2. The attachment assembly of claim 1, wherein said pair of upper engagement hooks is configured to securely receive an upper hitch pin of the implement.

3. The attachment assembly of claim 2, wherein the upper engagement hooks of said pair of upper engagement hooks are spaced apart from each other and are further configured to both simultaneously receive the upper hitch pin of the implement.

4. The attachment assembly of claim 3, wherein said connection elements comprise a central upper engagement hook, and wherein the upper engagement hooks of said pair of upper engagement hooks are positioned on either side of said central upper engagement hook.

5. The attachment assembly of claim 4, wherein each of said pair of upper engagement hooks and said central upper engagement hook is configured to simultaneously receive the upper hitch pin of the implement, such that said connection elements provide at least five points of connection for the implement.

6. The attachment assembly of claim 4, wherein said attachment assembly is configured to be shifted from a closed configuration, in which said implement-side frame is positioned adjacent to said tractor-side frame, to an open configuration, in which at least a portion of said implement-side frame is rotated away from said tractor-side frame.

7. The attachment assembly of claim 1, wherein each of said lower engagement hooks is configured to securely receive a lower hitch pin of the implement.

8. A method of attaching an implement to a tractor, said method comprising the steps of:

(a) providing an attachment assembly removably attached to the tractor and extending from the tractor, wherein the attachment assembly comprises a tractor-side frame and an implement-side frame rotatably coupled with the tractor-side frame, wherein the attachment assembly is configured to be shifted between a closed configuration and an open configuration, wherein the implement-side frame comprises connection elements configured to attach the implement to the implement-side frame, and wherein the connection elements provide at least four points of connection for the implement, wherein said connection elements include a pair of lower connection elements with each one of the pair positioned on a respective lateral side of the implement- side frame, and wherein said connection elements include at least a pair of upper connection elements centrally positioned between the pair of lower connection elements with respect to a lateral direction;

(b) removably coupling a power take-off (PTO) adapter with the implement-side frame;

(c) shifting the attachment assembly to the open configuration, wherein during said shifting of step (c), the PTO adapter rotates with respect to the implement-side frame;

(d) securing the implement-side frame to the implement; and (e) shifting the attachment assembly to the closed configuration.

9. The method of claim 8, wherein said pair of lower connection elements comprises a pair of lower engagement hooks and wherein said at least a pair of upper connection elements comprises a pair of upper engagement hooks.

10. The method of claim 9, wherein said securing of step (d) includes:

engaging the pair of upper engagement hooks of the implement-side frame with an upper hitch pin of the implement, raising the implement with the attachment assembly, and engaging a pair of lower engagement hooks of the implement-side frame with a pair of lower hitch pins of the implement.

11. The method of claim 8, wherein said pair of lower connection elements comprises a pair of lower engagement hooks, and wherein said at least a pair of upper connection elements comprises at least three upper engagement hooks.

12. The method of claim 8, wherein said securing of step (d) includes engaging a power take-off (PTO) driveline of the implement with the PTO adapter.

* * * * *